United States Patent
Matsumura et al.

(10) Patent No.: US 11,974,229 B2
(45) Date of Patent: Apr. 30, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 384 days.

(21) Appl. No.: 17/609,235

(22) PCT Filed: May 10, 2019

(86) PCT No.: PCT/JP2019/018838
§ 371 (c)(1),
(2) Date: Nov. 5, 2021

(87) PCT Pub. No.: WO2020/230220
PCT Pub. Date: Nov. 19, 2020

(65) Prior Publication Data
US 2022/0217647 A1 Jul. 7, 2022

(51) Int. Cl.
*H04W 52/04* (2009.01)
*H04W 52/14* (2009.01)

(52) U.S. Cl.
CPC .................. *H04W 52/146* (2013.01)

(58) Field of Classification Search
CPC ....... H04W 52/04; H04W 52/146; H04B 1/00
See application file for complete search history.

(56) References Cited

U.S. PATENT DOCUMENTS

| | | | |
|---|---|---|---|
| 2018/0317218 A1 | 11/2018 | Li et al. | |
| 2018/0332541 A1* | 11/2018 | Liu | .................. H04W 52/241 |
| 2019/0261353 A1* | 8/2019 | Wang | ...................... H04L 1/18 |
| 2020/0053724 A1* | 2/2020 | MolavianJazi | ....... H04L 5/0048 |
| 2020/0059867 A1 | 2/2020 | Haghighat et al. | |
| 2020/0229001 A1 | 7/2020 | Takata et al. | |

FOREIGN PATENT DOCUMENTS

| | | | |
|---|---|---|---|
| CA | 3067267 A1 * | 12/2018 | .......... H04W 52/146 |
| JP | 2019-503142 A | 1/2019 | |
| WO | 2018175784 A1 | 9/2018 | |

(Continued)

OTHER PUBLICATIONS

Office Action in the counterpart Chinese Application No. 201980098295. 1, dated May 30, 2023 (18 pages).

(Continued)

*Primary Examiner* — Blane J Jackson
(74) *Attorney, Agent, or Firm* — Osha Bergman Watanabe & Burton LLP

(57) ABSTRACT

A user terminal according to one aspect of the present disclosure includes: a control section that, in a case where a plurality of Transmission/Reception Points (TRPs) are configured, determines transmit power of uplink transmission based on a cumulative value of Transmit Power Control (TPC) commands calculated per TRP; and a transmitting section that performs the uplink transmission by using the transmit power. According to one aspect of the present disclosure, it is possible to perform appropriate transmit power control even in a case where multiple TRPs are used.

15 Claims, 9 Drawing Sheets

(56) References Cited

FOREIGN PATENT DOCUMENTS

WO     WO-2018175784 A1 *   9/2018            H04B 7/0617
WO         2019069572 A1     4/2019

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).

3GPP TS 38.213 V15.5.0 "3rd Generation Partnership Project; Technical Specification Group Radio Access Network; NR; Physical layer procedures for control (Release 15)" Mar. 2019 (23 pages).

3GPP TSG RAN WG1 #97; R1-1906236 "Enhancements on Multi-TRP and Multi-panel Transmission" ZTE; Reno, USA; May 13-17, 2019 (5 pages).

International Search Report issued in International Application No. PCT/JP2019/018838, dated Dec. 17, 2019 (4 pages).

Written Opinion issued in International Application No. PCT/JP2019/018838; dated Dec. 17, 2019 (4 pages).

Office Action issued in the counterpart Indian Application No. 202117051837, dated Aug. 10, 2023 (5 pages).

Office Action issued in counterpart Japanese Patent Application No. 2021-519060 dated Apr. 4, 2023 (6 pages).

* cited by examiner

USER TERMINAL AND RADIO COMMUNICATION METHOD

TECHNICAL FIELD

The present disclosure relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of a larger capacity and higher sophistication than those of LTE (Third Generation Partnership Project (3GPP) Releases (Rel.) 8 and 9), LTE-Advanced (3GPP Rel. 10 to 14) has been specified.

LTE successor systems (also referred to as, for example, the 5th generation mobile communication system (5G), 5G+ (plus), New Radio (NR) or 3GPP Rel. 15 or subsequent releases) are also studied.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It is studied for a future radio communication system (e.g., NR) that one or a plurality of Transmission/Reception Points (TRPs)) (multiple TRPs) perform DL transmission for a user terminal (User Equipment (UE)).

Separate HARQ-ACK feedback is studied as one method of Hybrid Automatic Repeat reQuest ACKnowledgement (HARQ-ACK) feedback in a case where the multiple TRPs are used. According to separate HARQ-ACK feedback, HARQ-ACK is separately transmitted per TRP.

However, according to previous NR specifications, study regarding transmit power control for the multiple TRPs that can be used for separate HARQ-ACK feedback has not sufficiently advanced yet. When the control is not appropriately performed, it is not possible to suitably realize, for example, a spatial diversity gain or high rank transmission in a case where the multiple TRPs are used, and there is a risk that an increase of a communication throughput is suppressed.

It is therefore one of objects of the present disclosure to provide a user terminal and a radio communication method that can perform appropriate transmit power control even in a case where multiple TRPs are used.

Solution to Problem

A user terminal according to one aspect of the present disclosure includes: a control section that, in a case where a plurality of Transmission/Reception Points (TRPs) are configured, determines transmit power of uplink transmission based on a cumulative value of Transmit Power Control (TPC) commands calculated per TRP; and a transmitting section that performs the uplink transmission by using the transmit power.

Advantageous Effects of Invention

According to one aspect of the present disclosure, it is possible to suitably control HARQ-ACK even in a case where multiple TRPs are used.

DESCRIPTION OF EMBODIMENTS

UL Transmit Power Control

Figure 1A:
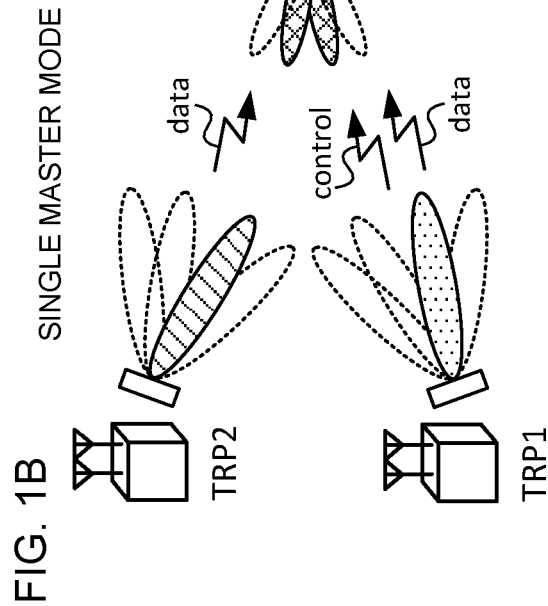
FIGS. 1A to 1D are diagrams illustrating one example of a multiple TRP scenario.

According to NR, a UE controls UL transmit power based on power control information. The power control information may be referred to as a Transmit Power Control (TPC) command. The TPC command may be referred to as, for example, a TPC value, an increase/decrease value or a correction value. The TPC command may be indicated by a given field (also referred to as a TPC command field) included in Downlink Control Information (DCI).

For example, the UE may decide a TPC command for a Physical Uplink Shared Channel (PUSCH) based on a TPC command field included in, for example, a DCI format 0_0 or 0_1. The UE may decide a TPC command for a Physical Uplink Control Channel (PUCCH) based on a TPC command field included in, for example, the DCI format 1_0 or 1_1.

A TPC used for PUSCH transmission may be configured independently per Bandwidth Part (BWP), carrier and serving cell. Furthermore, a TPC command value may be a value associated with bit information notified by a given DCI format. The bit information notified by the given DCI format and the value associated with the bit information may be defined in a table in advance.

Furthermore, the UE may accumulate each TPC command indicated by DCI for each PUSCH or PUCCH transmission. A network (e.g., base station) may configure whether or not to accumulate TPC commands to the UE. The base station may notify the UE of whether or not to accumulate the TPC commands by using a higher layer signaling (e.g., tpc-Accummlation).

In addition, in the present disclosure, the higher layer signaling may be one or a combination of, for example, a Radio Resource Control (RRC) signaling, a Medium Access Control (MAC) signaling and broadcast information.

The MAC signaling may use, for example, an MAC Control Element (MAC CE) or an MAC Protocol Data Unit (PDU). The broadcast information may be, for example, a Master Information Block (MIB), a System Information Block (SIB), Remaining Minimum System Information (RMSI), or Other System Information (OSI).

When accumulation of TPC commands is enabled, the UE may determine UL transmit power by taking into account TPC commands received in the past. Furthermore, the TPC command may be included in one (e.g., part of a given numerical expression) of parameters of a power control adjustment state defined by the given numerical expression.

In this regard, whether the power control adjustment state includes a plurality of states (2 states) or includes a single state may be configured by a higher layer parameter. Furthermore, when a plurality of power control adjustment states are configured, one of a plurality of these power control adjustment states may be identified based on an index 1 (the alphabet "1"). An independent power control adjustment state may be used per channel/signal, or a common power control adjustment state that is common between a plurality of channels/signals may be used.

When a plurality of power control adjustment state indices are configured, the UE may perform transmit power control (e.g., accumulation of TPC commands) per index.

A power control adjustment state index of a certain channel (e.g., a PUCCH or a PUSCH) may be associated with Spatial Relation Info (SRI) of the certain channel. The association may be configured to the UE by a higher layer signaling.

The power control adjustment state index may be determined based on information notified by DCI or an MAC CE.

For example, according to Rel-15 NR, in a case of a PUSCH, the UE may determine an SRI for the PUSCH based on a Sounding Reference Signal (SRS) Resource Indicator (SRI) included in DCI for scheduling the PUSCH, and use the power control adjustment state index configured in association with the SRI for transmit power control of the PUSCH.

Furthermore, according to Rel-15 NR, in a case of a PUCCH, the UE may activate SRI for the PUCCH by an MAC CE, and use the power control adjustment state index configured in association with the SRI for transmit power control of the PUCCH.

Thus, NR supports a method for determining transmit power by taking into account (e.g., accumulating) TPC commands notified for each UL channel (e.g., PUCCH or PUSCH) transmission. This power control based on a TPC command corresponds to closed loop power control.

Multiple TRPs

It is studied for NR that one or a plurality of Transmission/Reception Points (TRPs) (multiple TRPs) perform DL transmission for the UE by using one or a plurality of panels (multiple panels). Furthermore, it is studied that the UE performs UL transmission for one or a plurality of TRPs.

In addition, a plurality of TRPs may be associated with the same cell Identifier (ID), or may be associated with different cell IDs. The cell ID may be a physical cell ID or may be a virtual cell ID.

FIGS. 1A to 1D are diagrams illustrating one example of a multiple TRP scenario. These examples assume that each TRP can transmit four different beams. However, the present disclosure is not limited to these examples.

FIG. 1A illustrates one example of a case (that may be referred to as, for example, a single mode or a single TRP) that only one TRP (a TRP 1 in this example) of the multiple TRPs performs transmission for the UE. In this case, the TRP 1 transmits both of a control signal (PDCCH) and a data signal (PDSCH) to the UE.

Figure 1B:
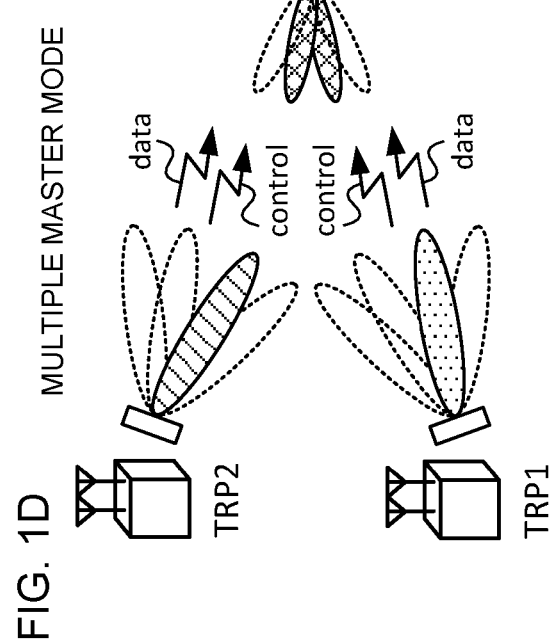

FIG. 1B illustrates one example of a case (that may be referred to as a single master mode) where only one TRP (the TRP 1 in this example) of the multiple TRPs transmits a control signal to the UE, and the multiple TRPs transmit data signals. The UE receives each PDSCH transmitted from the multiple TRPs based on one Downlink Control Information (DCI).

Figure 1C:
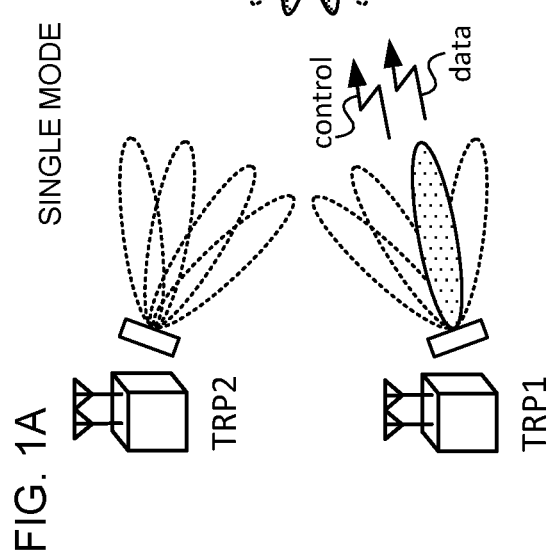

FIG. 1C illustrates one example of a case (that may be referred to as a master slave mode) where each of the multiple TRPs transmits part of a control signal to the UE, and the multiple TRPs transmit data signals. The TRP 1 may transmit a part 1 of the control signal (DCI), and a TRP 2 may transmit a part 2 of the control signal (DCI). The part 2 of the control signal may depend on the part 1. The UE receives each PDSCH transmitted from the multiple TRPs based on parts of these pieces of DCI.

Figure 1D:
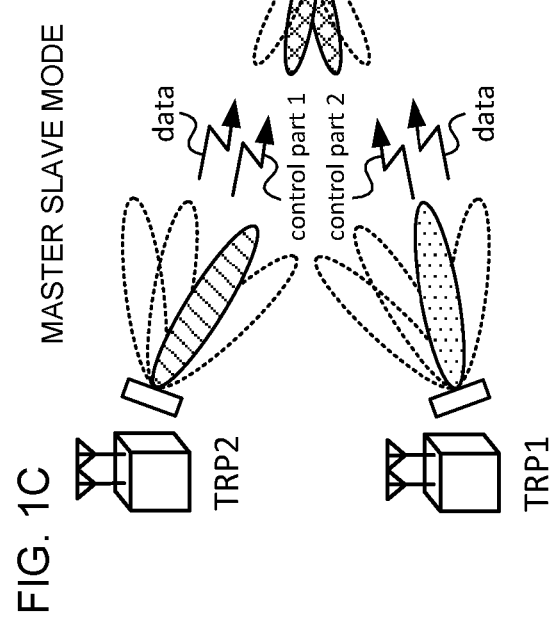

FIG. 1D illustrates one example of a case (that may be referred to as a multiple master mode) where each of the multiple TRPs transmits different control signals to the UE, and the multiple TRPs transmit data signals. The TRP 1 may transmit the first control signal (DCI), and the TRP 2 may transmit the second control signal (DCI). The UE receives each PDSCH transmitted from the multiple TRPs based on these pieces of DCI.

When a plurality of PDSCHs (that may be referred to as multiple PDSCHs) from the multiple TRPs illustrated in FIG. 1B are scheduled by using one DCI, the DCI may be referred to as single DCI (single PDCCH). Furthermore, when a plurality of PDSCHs from the multiple TRPs illustrated in FIG. 1D are respectively scheduled by using a plurality of pieces of DCI, a plurality of these pieces of DCI may be referred to as multiple pieces of DCI (multiple PDCCHs).

According to this multiple TRP scenario, it is possible to perform more flexible transmission control that uses channels of good quality.

Each TRP of the multiple TRPs may each transmit a different Code Word (CW) and a different layer. Non-Coherent Joint Transmission (NCJT) is studied as one mode of multiple TRP transmission.

According to NCJT, for example, the TRP 1 modulates, maps and performs layer mapping on a first code word, uses first precoding for a first number of layers (e.g., 2 layers), and thereby transmits a first PDSCH. Furthermore, the TRP 2 modulates, maps and performs layer mapping on a second code word, uses second precoding for a second number of layers (e.g., 2 layers), and thereby transmits a second PDSCH.

In addition, it may be defined that a plurality of PDSCHs (multiple PDSCHs) to be subjected to NCJT partially or fully overlap at least one of time and frequency domains. That is, the first PDSCH from the first TRP, the second PDSCH from the second TRP and at least one of the time and frequency resources may overlap.

It may be assumed that these first PDSCH and second PDSCH do not have a Quasi-Co-Location (QCL) relation (are not quasi-co-located). Reception of the multiple PDSCHs may be read as simultaneous reception of PDSCHs that do not QCLed with QCL type D.

By the way, separate HARQ-ACK is studied as one of Hybrid Automatic Repeat reQuest ACKnowledgements (HARQ-ACKs) for multiple PDSCHs.

The separate HARQ-ACK corresponds to feedback for transmitting HARQ-ACK per TRP in pluralities of Physical Uplink Control Channel (PUCCH))/Physical Uplink Shared Channel (PUSCH) resources. These pluralities of PUCCH/PUSCH resources may overlap (may be simultaneously transmitted) or may not overlap.

In addition, the PUCCH/PUSCH may mean at least one of the PUCCH and the PUSCH (hereinafter, "A/B" may be read as "at least one of A and B" likewise).

DCI for scheduling multiple PDSCHs may include a field of a PUCCH Resource Indicator (PRI). The PRI may correspond to information that indicates a resource for transmitting HARQ-ACK associated with a PDSCH, and may be referred to as an ACK/NACK Resource Indicator (ARI).

The UE may decide PUCCH resources for transmitting HARQ-ACKs associated with the above multiple PDSCHs based on the PRI.

By using separate HARQ-ACK, it is possible to independently transmit HARQ-ACK per TRP. When backhaul latency between TRPs is great (for example, TRPs are connected by a non-ideal backhaul), HARQ latency does not become great.

A PUCCH resource of separate HARQ-ACK for each TRP may be configured to or may be configured to not be permitted to temporarily overlap. It is studied to define a PUCCH resource group to flexibly control PUCCH resources of separate HARQ-ACKs.

For example, the UE to which the PUCCH resource group is configured by the network may assume that all PUCCH resources included in a first PUCCH resource group do not temporarily overlap all PUCCH resources included in a second PUCCH resource group.

Separate HARQ-ACK feedback may be preferably supported for multiple TRP transmission. In this case, transmit power control per TRP is preferably supported. This is because it is thought that a distance (or path loss) between the UE and the TRP 1 and a distance (or path loss) between the UE and the TRP 2 are generally different.

Figure 2:
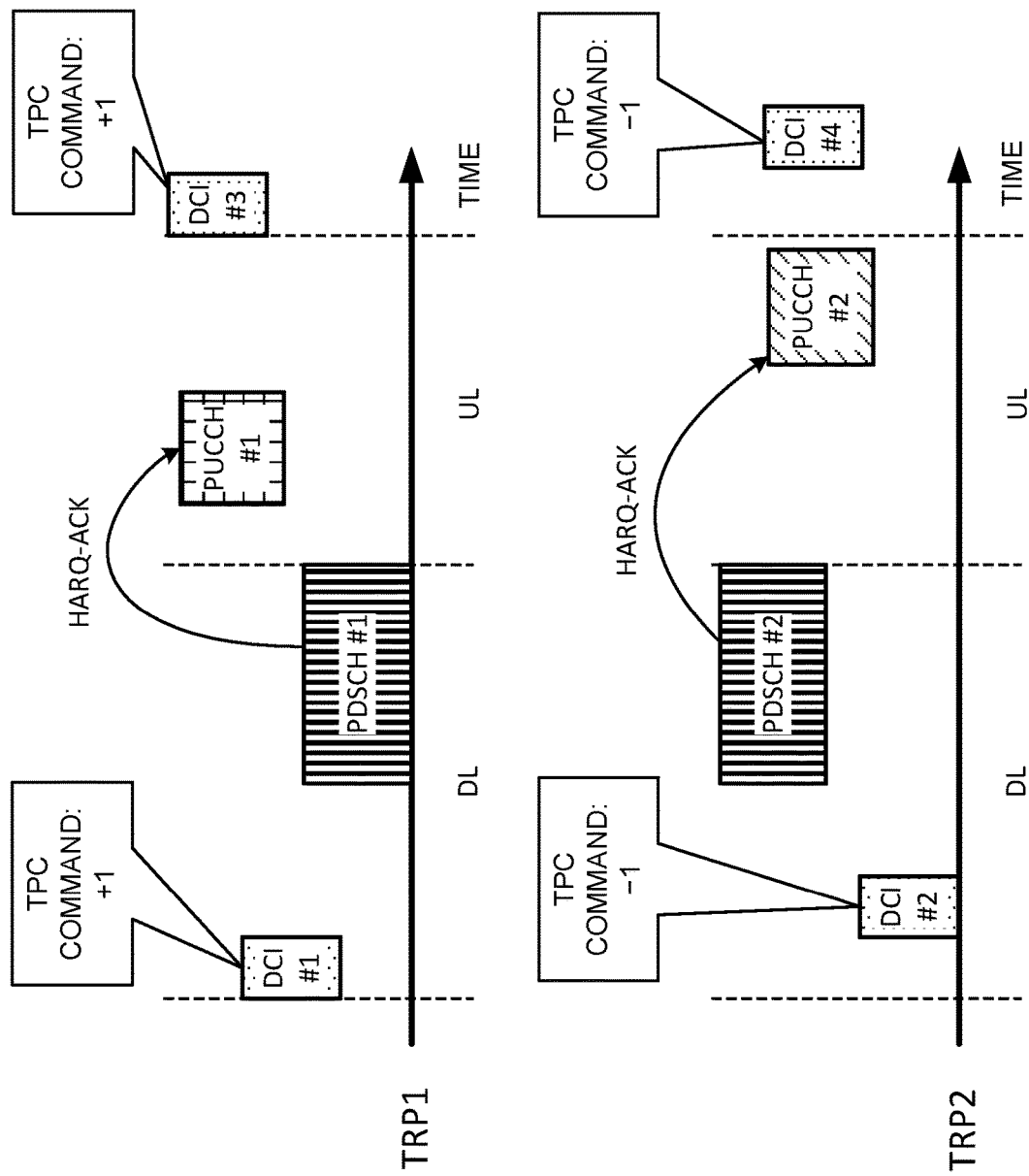
FIG. 2 is a diagram illustrating a problem of power control based on a TPC command that cannot distinguish between TRPs.

However, according to power control based on a TPC command according to legacy Rel-15 NR, it is not possible to distinguish between TRPs, and therefore it is difficult to appropriately perform transmit power control per TRP. FIG. 2 is a diagram illustrating a problem of power control based on a TPC command that cannot distinguish between TRPs.

In this example, multiple TRPs (TRPs 1 and 2) are configured to the UE. The UE receives DCI #1 that indicates a PDSCH #1 of the TRP 1 (DMRS port group 1) from the TRP 1, and transmits HARQ-ACK associated with the PDSCH #1 in a PUCCH #1 to the TRP 1. In this regard, a resource of the PUCCH #1 may be indicated by a given field (e.g., PRI) of the DCI #1.

Furthermore, at a timing a little after reception of the DCI #1, the UE receives DCI #2 that indicates a PDSCH #2 of the TRP 2 (DMRS port group 2) from the TRP 2, and transmits HARQ-ACK associated with the PDSCH #1 in a PUCCH #2 to the TRP 2. In this regard, a resource of the PUCCH #2 may be indicated by a given field (e.g., PRI) of the DCI #2.

The PDSCHs #1 and #2 may fully overlap, may partially overlap, or may not overlap.

Furthermore, after transmitting the PUCCHs #1 and #2, the UE receives DCI #3 for scheduling another PDSCH from the TRP 1, and receives DCI #4 from the TRP 2.

Now, it is assumed that the pieces of DCI #1, #2, #3 and #4 include field values respectively corresponding to +1, −1, +1 and −1 [dB] as TPC commands for PUCCHs. In this case, power control applied to the PUCCHs #1 and #2 are influenced by both of the pieces of DCI #1 and #2, and cumulative values of both of the pieces of DCI #1 and #2 are 0 (=+1−1).

A preferable operation applies +1 to the PUCCH #1 and applies −1 to the PUCCH #2. However, it is difficult to realize this operation by power control that is based on a TPC command according to legacy Rel-15 NR (it is also difficult to switch a power control adjustment state between the PUCCHs #1 and #2).

Furthermore, during subsequent power control, too, the cumulative value 0 is applied to each of the PUCCH associated with the DCI #3 and the PUCCH associated with the DCI #4 likewise. In this case, too, +2 is preferably applied to the former, and −2 is preferably applied to the latter.

As described above, study on transmit power control for multiple TRPs has not yet advanced sufficiently in a current specification. When this control is not appropriately performed, it is not possible to suitably realize a spatial diversity gain and high rank transmission in a case where the multiple TRPs are used, and there is a risk that an increase of a communication throughput is suppressed.

Hence, the inventors of the present disclosure have conceived a transmit power control method that can support a case where multiple TRPs are used.

Embodiments according to the present disclosure will be descried in detail below with reference to the drawings. A radio communication method according to each embodiment may be each applied alone or may be applied in combination.

In addition, in the present disclosure, a panel, an Uplink (UL) transmission entity, a TRP, a spatial relation, a COntrol REsource SET (CORESET), a PDSCH, a code word, a base station, a given antenna port (e.g., DeModulation Reference Signal (DMRS) port), a given antenna port group (e.g., DMRS port group), and given groups (e.g., a Code Division Multiplexing (CDM) group, a given reference signal group and a CORESET group) may be interchangeably read. Furthermore, a panel Identifier (ID) and a panel may be interchangeably read. A TRP ID and a TRP may be interchangeably read.

Furthermore, in the present disclosure, NCJT, NCJT that uses multiple TRPs, multiple PDSCHs that use NCJT, the multiple PDSCHs and a plurality of PDSCHs from the multiple TRPs may be interchangeably read.

The following embodiments will be described assuming separate HARQ-ACK, yet may be applied to joint HARQ-ACK. Furthermore, the following embodiments will be described assuming that multiple PDSCHs are scheduled by multiple PDCCHs, yet may be applied to a case where the multiple PDSCHs are scheduled by a single PDCCH.

In addition, in the present disclosure, SRI may be interchangeably read as Spatial Relation Info (SRI) of a PUCCH, an RRC parameter "Spatialrelationinfo" and an SRI ID.

The following embodiments will be described mainly assuming transmit power of a PUCCH, yet may be applied to other UL channels/signals. In addition, a UL channel/signal may mean at least one of a UL channel and a UL signal. That is, the UL channel/signal in the following embodiments may be read as at least one of a PUCCH, a PUSCH and an SRS.

Radio Communication Method

First Embodiment

According to the first embodiment, a TPC command of a UL channel/signal (e.g., a PUCCH or a PUSCH) is accumulated per corresponding TRP.

A UE may calculate a cumulative value of TPC commands per TRP by using a TPC command value (e.g., a TPC command value included in DCI associated with each TRP) per TRP. Furthermore, the UE determines transmit power at a time of transmission of a UL channel/signal per TRP based on the cumulative value of the TPC commands per TRP.

The UE may calculate transmit power per TRP by using a calculation formula obtained by introducing a parameter (e.g., TRP ID) related to a TRP as an argument such as a TPC command or a cumulative value of TPC commands in a calculation formula of legacy UL transmit power control.

The UE may calculate a power control adjustment state index based on the parameter related to the TRP. In this case, an increased value that the power control adjustment state index can take in the calculation formula of legacy UL transmit power control may be used.

When, for example, the first embodiment is used for the case illustrated in FIG. 2, the UE decides that pieces of DCI #1, #2, #3 and #4 include TPC commands for TRPs 1, 2, 1 and 2, respectively. Hence, the UE can respectively apply +1 to a PUCCH #1, −1 to a PUCCH #2, +2 to a PUCCH #3 (associated with the DCI #3), and −2 to a PUCCH #4 (associated with the DCI #4) as the cumulative value of the TPC commands for transmit power control.

In addition, in the present disclosure, the UE to which a plurality of TRPs are configured may assume to decide at least one of a TRP associated with DCI, a TRP associated with a PDSCH or UL transmission (such as a PUCCH, a PUSCH or an SRS) scheduled by DCI, and a TRP that accumulates TPC commands based on at least one of followings:

A value of a given field (e.g., a field that indicates a TRP or CDM) included in DCI,
A DMRS (e.g., a sequence of the DMRS, a resource, a CDM group, a DMRS port or a DMRS port group) associated with a PDSCH/PUSCH to be scheduled,
A DMRS (e.g., a sequence of the DMRS, a resource, a CDM group, a DMRS port or a DMRS port group) associated with a PDCCH in which DCI has been transmitted, and
A CORESET (e.g., an ID of the CORESET, a scramble ID or a resource) in which DCI has been received.

In this regard, the above-described DCI may be DCI for scheduling a PUSCH/SRS, or DCI for scheduling a PDSCH (associated with a PUCCH (HARQ-ACK)). The above-described DCI may be, for example, DCI formats 1_0/1_1, 0_0/0_1 and 2_2/2_3.

When at least one of a CORESET, a search space set, QCL and a TCI state associated with a TRP in advance is configured to the UE, the UE may decide which PDSCH (PUCCH)/PUSCH/SRS of which TRP is scheduled by DCI based on at least one of a CORESET, a search space set, QCL and a TCI state used to detect the DCI.

Note that, the UE may calculate a cumulative value of TPC commands instead of calculating the cumulative value per TRP or with calculating the cumulative value in a TRP unit, and may calculate the cumulative value per spatial relation (or spatial relation info) or may calculate the cumulative value per given group (e.g., a PUCCH resource group or a spatial relation group).

In this regard, the given group may be configured to the UE by an RRC signaling, an MAC signaling (e.g., MAC CE) or a combination of these signalings.

The above PUCCH Resource Group (PRG) may correspond to a PUCCH Resource Group for TRP (TRP PUCCH Resource Group (a TRP-PRG or a T-PRG)), or may correspond to a PUCCH Resource Group for SRI (SRI PUCCH Resource Group (an SRI-PRG or an S-PRG)).

The T-PRG may be interchangeably read as a PUCCH resource group related to multiple TRPs and a group for PUCCH resource allocation. The S-PRG may be interchangeably read as a PUCCH resource group for at least one of indication and update of PUCCH SRI.

The UE may assume that a PUCCH resource belonging to one T-PRG is associated with the same TRP. The UE may assume that respectively different TRPs are associated with a PUCCH resource belonging to a first T-PRG and a PUCCH resource belonging to a second T-PRG.

The UE may assume to use the same SRI for a PUCCH resource belonging to one S-PRG. The UE may assume that respectively different pieces of SRI are used for the PUCCH resource belonging to the first S-PRG and the PUCCH resource belonging to the second S-PRG.

Furthermore, the "group" in the present disclosure may be read as grouping, a sequence, a list and a set. Furthermore, the resource group may be read as one or a plurality of resources. That is, the T-PRG and the S-PRG may respectively correspond to one or a plurality of resources.

The T-PRG may be read as one or a plurality of resources associated with the same TRP. The S-PRG may be read as one or a plurality of resources associated with the same SRI (or, for example, the same reference signal or the same reference signal resource).

An association between group IDs (group indices) and PUCCH resource IDs may be configured to the UE per PUCCH configuration information (RRC information element "PUCCH-Config"), per PUCCH resource set or per PUCCH resource.

In addition, when a PUCCH resource group is not explicitly configured by a network, the UE may group PUCCH resources configured by the network according to a given rule, and thereby regard the PUCCH resources as the PUCCH resource group. The PUCCH group determined (assumed or regarded) without being configured by the network may be referred to as a default PUCCH group.

For example, the UE may decide a PUCCH group to which corresponding PUCCH resources belong, based on a PRI value of received DCI. For example, the UE may decide the default PUCCH group to which the corresponding PUCCH resources belong, based on whether a given bit position (e.g., a most significant bit or a least significant bit) of a PRI value (e.g., 000 to 111) is 1 or 0 (e.g., the default PUCCH group is a PUCCH group 1 when the given bit position is 1, and is a PUCCH group 2 when the given bit position is 0).

Furthermore, the UE may decide the PUCCH group to which the corresponding PUCCH resources belong, based on PUCCH resource IDs configured by a higher layer signaling by the network. For example, the UE may group the corresponding PUCCH resources according to whether the PUCCH resource IDs are odd numbers or even numbers or whether the PUCCH resource IDs are larger or smaller than a given value.

Figure 3:
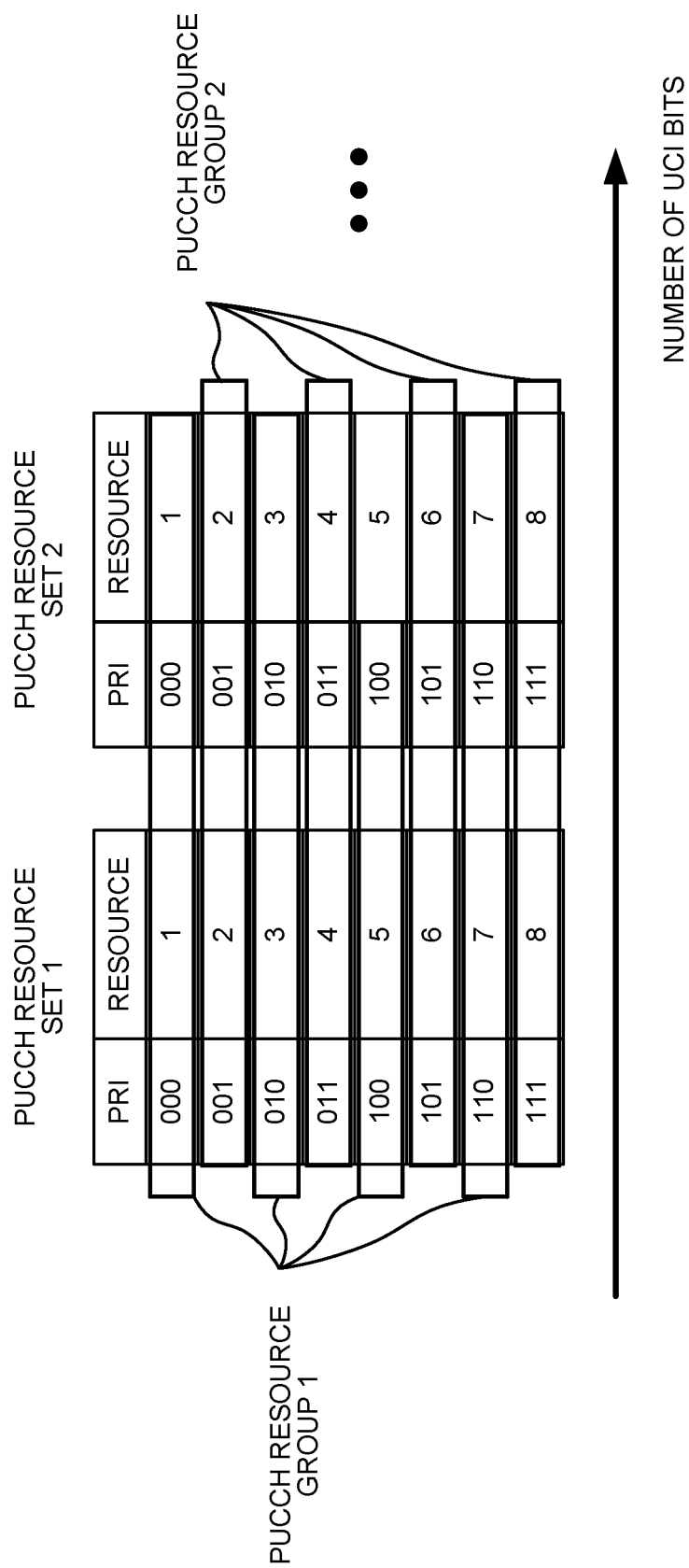
FIG. 3 is a diagram illustrating one example of PUCCH resource groups.

FIG. 3 is a diagram illustrating one example of PUCCH resource groups. This example is an example where each PUCCH resource set is configured to include eight PUCCH resources (PUCCH resources 1 to 8), and one of these eight PUCCH resources can be indicated by a PRI (the PRI is 3 bits). For example, PRI field values=000, 001, . . . and 111 are associated with PUCCH resources 1, 2, . . . and 8, respectively.

In addition, in the present disclosure, it may be specified that larger i is used for a PUCCH resource set i when a UCI bit size is larger. However, the present disclosure is not limited to this. Furthermore, an example where the number of PUCCH resources included in one PUCCH resource set will be described. However, the present disclosure is not limited to this.

In addition, resources X of a PUCCH resource set 1 and resources X of a PUCCH resource set 2 may indicate the same resources, or may indicate different resources.

In FIG. 3, irrespectively of a PUCCH resource set, the PRI value=even numbers ({000, 010, 100, 110}) are associated with the PUCCH resource group 1, and the PRI value=odd numbers ({001, 011, 101, 111}) are associated with the PUCCH resource group 2.

In addition, the PUCCH resource group may be commonly configured to a plurality of PUCCH resource sets as illustrated in FIG. 3, or may be independently configured per PUCCH resource set.

Now, a case will be considered where the UE configured as illustrated in FIG. 3 receives first DCI that indicates a resource 1, second DCI that indicates a resource 2, third DCI that indicates a resource 3, and fourth DCI that indicates a resource 4. Hereinafter, it is assumed that the pieces of first, second, third and fourth DCI are associated with TPC command values +1, −1, +1 and −1, respectively.

In this case, the UE that has received these four pieces of DCI may determine that a cumulative value of TPC commands of the PUCCH resource group 1 is +2 (a sum of +1 of the resource 1 and +1 of the resource 3), and a cumulative value of TPC commands of the PUCCH resource group 2 is −2 (a sum of −1 of the resource 2 and −1 of the resource 4).

In addition, the UE may calculate the cumulative value of TPC commands per PUCCH resource, or may calculate the cumulative value of TPC commands per PUCCH resource set group. The PUCCH resource set group may be assumed as PUCCH resource groups that are over a plurality of PUCCH resource sets. The PUCCH resource set group may be also referred to as a PUCCH resource group.

A PUCCH resource set group associated with TRPs may be configured to the UE by using, for example, a higher layer signaling. The group may be configured to the UE by using, for example, a TRP ID (or a group ID), a PUCCH resource set ID or a PUCCH resource ID.

Figure 4:
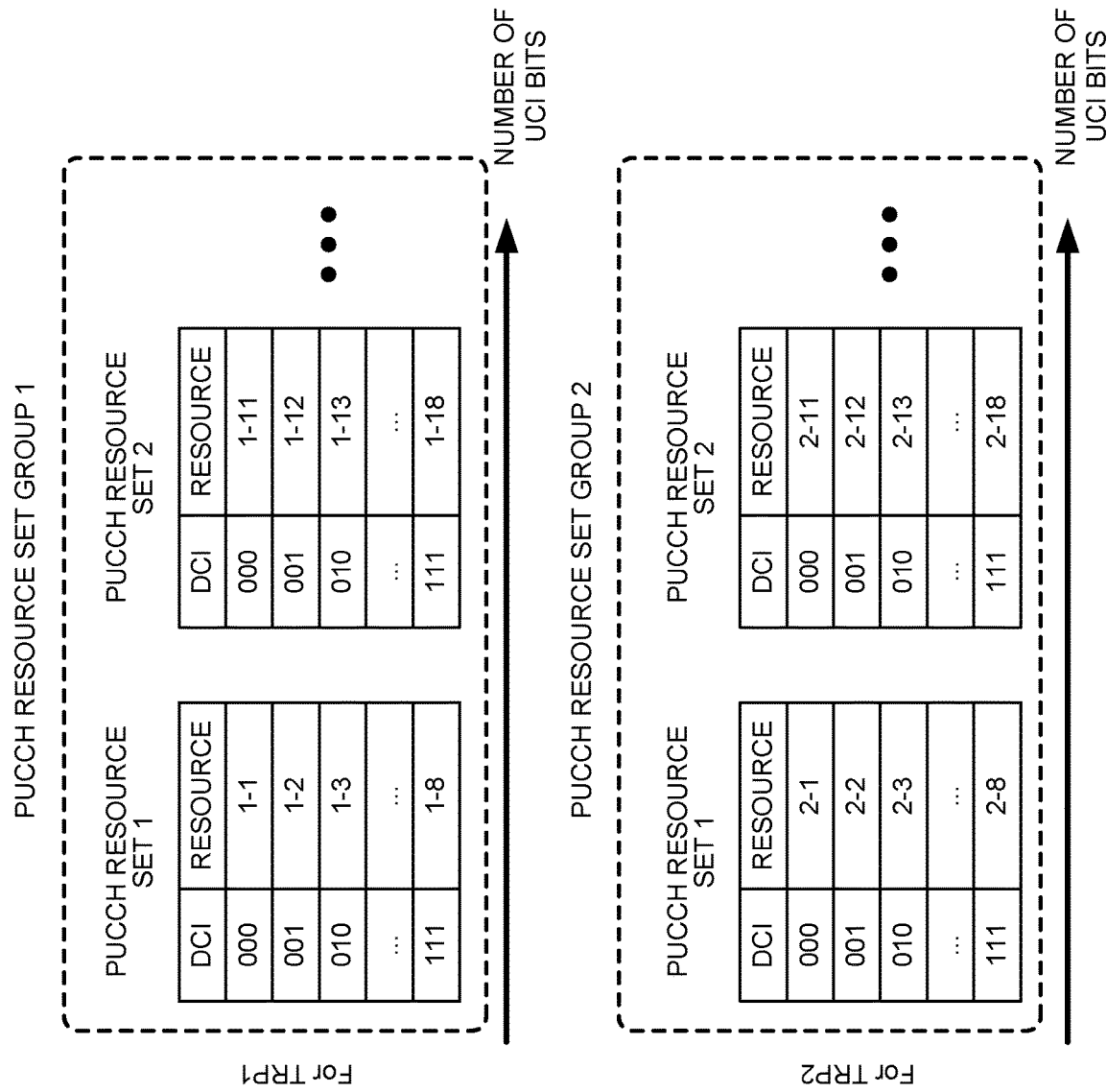
FIG. 4 is a diagram illustrating one example of PUCCH resource set groups.

FIG. 4 is a diagram illustrating an example of PUCCH resource set groups. In this example, a PUCCH resource set group including the PUCCH resource sets 1, 2 and . . . is configured to the UE per TRP. The TRP 1 is associated with a group 1, and the TRP 2 is associated with a group 2. In addition, a maximum number of PUCCH resource sets may be 4, or may take a value different from 4.

Now, a case is assumed where the UE configured as illustrated in FIG. 4 receives first DCI that indicates a resource 1-1, second DCI that indicates a resource 2-1, third DCI that indicates a resource 1-2, and fourth DCI that indicates a resource 2-2. Hereinafter, it is assumed that the pieces of first, second, third and fourth DCI are associated with TPC command values +1, −1, +1 and −1, respectively.

In this case, the UE that has received these four pieces of DCI may determine that a cumulative value of TPC commands of a PUCCH resource set group 1 is +2 (a sum of +1 of the resource 1-1 and +1 of the resource 1-2), and a cumulative value of TPC commands of a PUCCH resource set group 2 is −2 (a sum of −1 of the resource 2-1 and −1 of the resource 2-2).

According to the above-described first embodiment, it is possible to appropriately control UL transmit power based on a cumulative value of TPC commands per TRP.

Second Embodiment

In the second embodiment, regarding accumulation of TPC commands, multiple TRPs may be dynamically switched to a single TRP. This is because a UE to which the multiple TRPs are configured supports a case where the multiple TRPs are instantaneously switched to the single TRP.

In, for example, at least one of following cases, the UE instantaneously performs transmission and reception to and from the single TRP:

A case where simultaneous reception of another PDSCH that does not have a QCL type-D relation with a certain PDSCH is not scheduled in one or a plurality of symbols (e.g., all symbols) of the certain PDSCH (described later with reference to FIG. 5), A case where a channel state (e.g., SNR) deteriorates, and single TRP transmission is scheduled by DCI, A case where a mistake in detecting at least one DCI of multiple pieces of DCI (PDCCHs) occurs, and A case where one TCI state for PDSCH reception is indicated or assumed.

Figure 5:
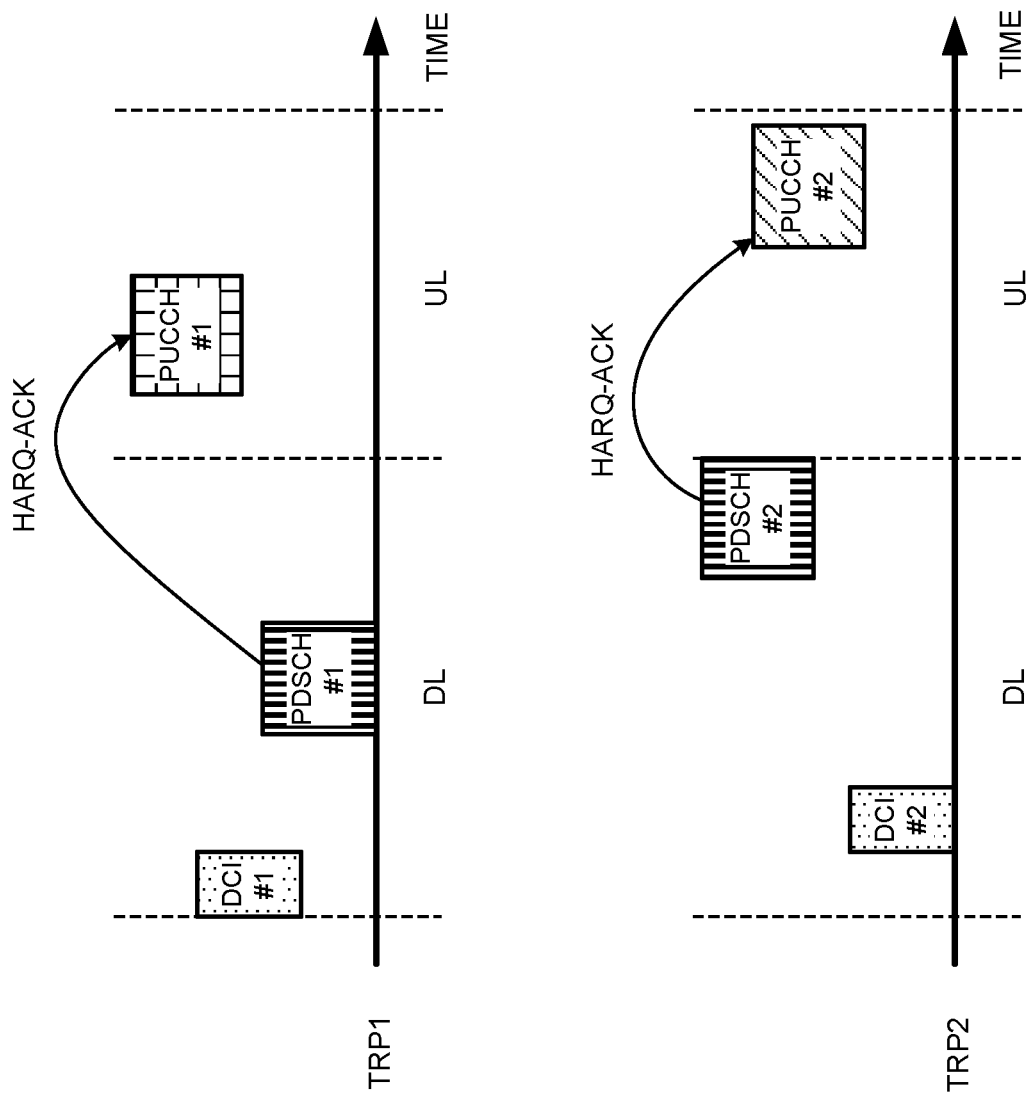
FIG. 5 is a diagram illustrating one example where an operation is instantaneously switched to an S-TRP operation.

FIG. 5 is a diagram illustrating one example where an operation is instantaneously switched to an S-TRP operation. FIG. 5 is similar to the example of FIG. 2, yet differs from FIG. 2 in that PDSCHs #1 and 2 are not simultaneously received (at least time resources do not overlap). In this case, it is necessary to clarify whether to take into account only DCI #1 associated with the same TRP or take into account both of pieces of DCI #1 and 2 irrespectively of whether or not the pieces of DCI #1 and 2 are associated with the same TRP as a cumulative value of TPC commands of, for example, a PUCCH #1.

The UE may operate based on at least one of followings in a case where multiple TRPs are configured:

(1) TPC commands are accumulated per TRP at all times.

(2) TPC commands in a case where the multiple TRPs are instantaneously switched to a single TRP (e.g., a case where one of the above conditions is satisfied) are accumulated as a cumulative value of TPC commands that is common between TRPs.

(3) TPC commands in a case where the multiple TRPs are instantaneously switched to the single TRP are accumulated as a cumulative value of TPC commands for the single TRP.

(4) TPC commands in a case where the multiple TRPs are instantaneously switched to the single TRP are accumulated as a cumulative value of TPC commands for each TRP.

In above (1), the UE may assume that it is possible to semi-statically switch the multiple TRPs to the single TRP with regard to accumulation of the TPC commands, yet dynamic switching is not performed. In this regard, in a case where the multiple TRPs are not configured, the UE may accumulate the TPC commands irrespectively of TRPs (an operation according to Rel-15 NR).

In a case of above (1), even when a multiple TRP operation is switched to a single TRP operation, the UE can manage power per TRP at all times.

According to semi-static switching of a TPC command accumulation method based on above (1), it is possible to simplify a UE operation, so that it is possible to reduce a UE processing load, and reduce implementation cost of the UE.

In above (2), the UE may accumulate TPC commands per TRP during the multiple TRP operation, and may accumulate TPC commands irrespectively of TRPs similar to Rel-15 NR during the single TRP operation.

In a case of above (2), the UE to which, for example, two TRPs are configured independently calculate a cumulative value of TPC commands for a TRP 1, a cumulative value of TPC commands for a TRP 2, and a cumulative value of TPC commands that is common between TRPs.

The cumulative value of the TPC commands for the TRP 1 may be calculated by accumulating all of TPC commands for the TRP 1 for the multiple TRPs (the TPC commands of the TRP 1 in a case of the multiple TRPs) and the TPC commands for the TRP 1 for the single TRP, or may be calculated by accumulating only the TPC commands for the TRP 1 for the multiple TRPs.

The cumulative value of the TPC commands for the TRP 2 may be calculated by accumulating all of TPC commands for the TRP 2 for the multiple TRPs (the TPC commands of the TRP 2 in the case of the multiple TRPs) and the TPC commands for the TRP 2 for the single TRP, or may be calculated by accumulating only the TPC commands for the TRP 2 for the multiple TRPs.

The cumulative value of the TPC commands that is common between the TRPs may be calculated by accumulating all of TPC commands for the multiple TRPs (the TPC commands for the TRP 1 for the multiple TRPs, and the TPC commands for the TRP 2 for the multiple TRPs), and TPC commands for the single TRP (the TPC commands for the TRP 1 for the single TRP, and the TPC commands for the TRP 2 for the single TRP), or may be calculated by accumulating only the TPC commands for single TRP.

According to dynamic switching of the TPC command accumulation method based on above (2), it is possible to commonalize a power control operation in a case of, for example, single TRP (single PDSCH) reception and Rel-15 NR, and simplify a UE operation.

In above (3), the UE may accumulate TPC commands for the multiple TRPs per TRP during the multiple TRP operation, and may accumulate TPC commands for the single TRP per TRP during the single TRP operation.

In a case of above (3), the UE to which, for example, two TRPs are configured independently calculate a cumulative value of the TPC commands for the TRP 1 for the multiple TRPs, a cumulative value of the TPC commands for the TRP 2 for the multiple TRPs, a cumulative value of the TPC commands for the TRP 1 for the single TRP, and a cumulative value of the TPC commands for the TRP 2 for the single TRP.

The cumulative value of the TPC commands for the TRP 1 for the multiple TRPs may be calculated by accumulating all of TPC commands for the TRP 1 for the multiple TRPs and the TPC commands for the TRP 1 for the single TRP, or may be calculated by accumulating only the TPC commands for the TRP 1 for the multiple TRPs (the TPC commands of the TRP 1 in the case of the multiple TRPs).

The cumulative value of the TPC commands for the TRP 2 for the multiple TRPs may be calculated by accumulating all of TPC commands for the TRP 2 for the multiple TRPs and the TPC commands for the TRP 2 for the single TRP, or may be calculated by accumulating only the TPC commands for the TRP 2 for the multiple TRPs (the TPC commands of the TRP 2 in the case of the multiple TRPs).

The cumulative value of the TPC commands for the TRP 1 for the single TRP may be calculated by accumulating all of TPC commands for the TRP 1 for the multiple TRPs and the TPC commands for the TRP 1 for the single TRP, or may be calculated by accumulating only the TPC commands for the TRP 1 for the single TRP (the TPC commands of the TRP 1 in the case of the single TRP).

The cumulative value of the TPC commands for the TRP 2 for the single TRP may be calculated by accumulating all of TPC commands for the TRP 2 for the multiple TRPs and the TPC commands for the TRP 2 for the single TRP, or may be calculated by accumulating only the TPC commands for the TRP 2 for the single TRP (the TPC commands of the TRP 2 in the case of the single TRP).

In above (4), the UE accumulates TPC commands per TRP during the multiple TRP operation, and accumulates TPC commands respectively at both of TRPs during the single TRP operation.

In the case of above (4), the UE to which, for example, two TRPs are configured independently calculate a cumulative value of TPC commands for the TRP 1, and a cumulative value of TPC commands for the TRP 2.

The cumulative value of the TPC commands for the TRP 1 may be calculated by accumulating all of TPC commands for the multiple TRPs for the TRP 1 and the TPC commands for the single TRP for the TRP 1.

The cumulative value of the TPC commands for the TRP 2 may be calculated by accumulating all of TPC commands for the multiple TRPs for the TRP 2 and the TPC commands for the single TRP for the TRP 2.

According to dynamic switching of the TPC command accumulation method based on above (3) and (4), even in a case where, for example, the UE makes a mistake in detecting one DCI of multiple pieces of DCI, it is possible to equalize transmit power values between this case and a case where DCI is appropriately received, and improve PUCCH reception performance of a network. Furthermore, a case where an operation is performed at the single TRP at a time when the multiple TRPs are configured is assumed to correspond to a case where TRPs positions are dispersed, and it is possible to perform closed loop power control by taking the TRP positions into account, so that it is possible to expect improvement of UL channel/signal characteristics compared to Rel-15 NR.

In addition, when the UE cannot (or do not) decide which TRP the TPC commands in the case of the single TRP in a case where the multiple TPCs are configured are for, the UE may perform an operation where TPC commands for a TRP X for the single TRP in above-described (1) to (4) are read as the TPC commands (i.e., TPC commands for an arbitrary single TRP).

In, for example, above (4), the cumulative value of the TPC commands for the TRP 1 may be calculated by accumulating all of TPC commands for the multiple TRPs for the TRP 1 and the TPC commands for the arbitrary single TRP, or the cumulative value of the TPC commands for the TRP 2 may be calculated by accumulating all of TPC commands for the multiple TRPs for the TRP 2 and the TPC commands for the arbitrary single TRP.

According to the above-described second embodiment, it is possible to accumulate TPC commands by taking instantaneous switching of the single TRP into account.

Others

The UE may report UE capability information related to whether or not the UE supports NCJT of the multiple TRPs, how many PDSCHs the UE can simultaneously receive, and TPC accumulation of the multiple TRPs (at least one of accumulations described in the above-described embodiments) to the network.

The UE capability information may include information related to at least one of followings:
  Whether or not the UE supports NCJT of the multiple TRPs,
  The supported number of simultaneous reception PDSCHs,
  The supported number of simultaneous reception code words,
  The supported number of simultaneous reception TRPs,
  The supported number of simultaneous reception layers,
  The supported number of simultaneous reception spatial domain filters (how many PDSCHs that do not QCLed with QCL type D can be simultaneously received),
  The supported number of CORESETs per BWP,
  A supported multiple TRP type (e.g., a single PDCCH or multiple PDCCHs),
  Supported HARQ-ACK feedback (e.g., joint feedback or separate feedback),
  (Assumption of) a supported backhaul (e.g., an ideal backhaul or a non-ideal backhaul), and
  A supported overlapping type of time/frequency resources of the multiple PDSCHs (e.g., fully overlapping, non-overlapping or partially overlapping).

In addition, the UE may report a value equal to or more than 4 (e.g., 4, 5 or 6) as the above supported number of CORESETs per BWP. Rel-15 NR specifies the number of CORESETs per BWP as 3 at maximum. However, this is because, in a case where one TRP is configured to be associated with one CORESET, there are preferably 4 or more available CORESETs.

In addition, the supported overlapping type of the time/frequency resources of the multiple PDSCHs may be information that indicates fully-overlapping, non-overlapping or partially-overlapping with regard to at least the time resources.

For the UE that has reported that the UE supports the above UE capability, the network may give notification of at least one of information that enables NCJT of the multiple TRPs, the number of PDSCHs to be simultaneously received, and information that enables TPC accumulation of the multiple TRPs.

The present disclosure has mainly described the example where Uplink Control Information (UCI) (HARQ-ACK) is transmitted by using a PUCCH. However, the present disclosure is not limited to this. Contents of the present disclosure is applicable to a case, too, where UCI is transmitted by using a PUSCH (UCI on PUSCH). The PUSCH may be a PUSCH scheduled by DCI, or may be a configured grant PUSCH. Spatial relation info of a PUCCH may be read as spatial relation info of a Sounding Reference Signal (SRS) for a PUSCH.

Furthermore, HARQ-ACK according to the present disclosure may be read as one or a combination of, for example, Channel State Information (CSI) and a Scheduling Request (SR).

In the present disclosure, a single PDCCH (DCI) may be referred to as a PDCCH (DCI) of a first scheduling type (e.g., scheduling type A (or type 1)). Furthermore, multiple PDCCHs (DCI) may be referred to as PDCCHs (DCI) of a second scheduling type (e.g., scheduling type B (or type 2)).

In the present disclosure, it may be assumed that the single PDCCH is supported in a case where the multiple TRPs use an ideal backhaul. It may be assumed that the multiple PDCCHs are supported in a case where a non-ideal backhaul is used between the multiple TRPs.

In addition, the ideal backhaul may be referred to as, for example, a DMRS port group type 1, a reference signal related group type 1 or an antenna port group type 1. The non-ideal backhaul may be referred to as a DMRS port group type 2, a reference signal related group type 2 or an antenna port group type 2. Names are not limited these.

Radio Communication System

The configuration of the radio communication system according to one embodiment of the present disclosure will be described below. This radio communication system uses one or a combination of the radio communication method according to each of the above embodiments of the present disclosure to perform communication.

Figure 6:
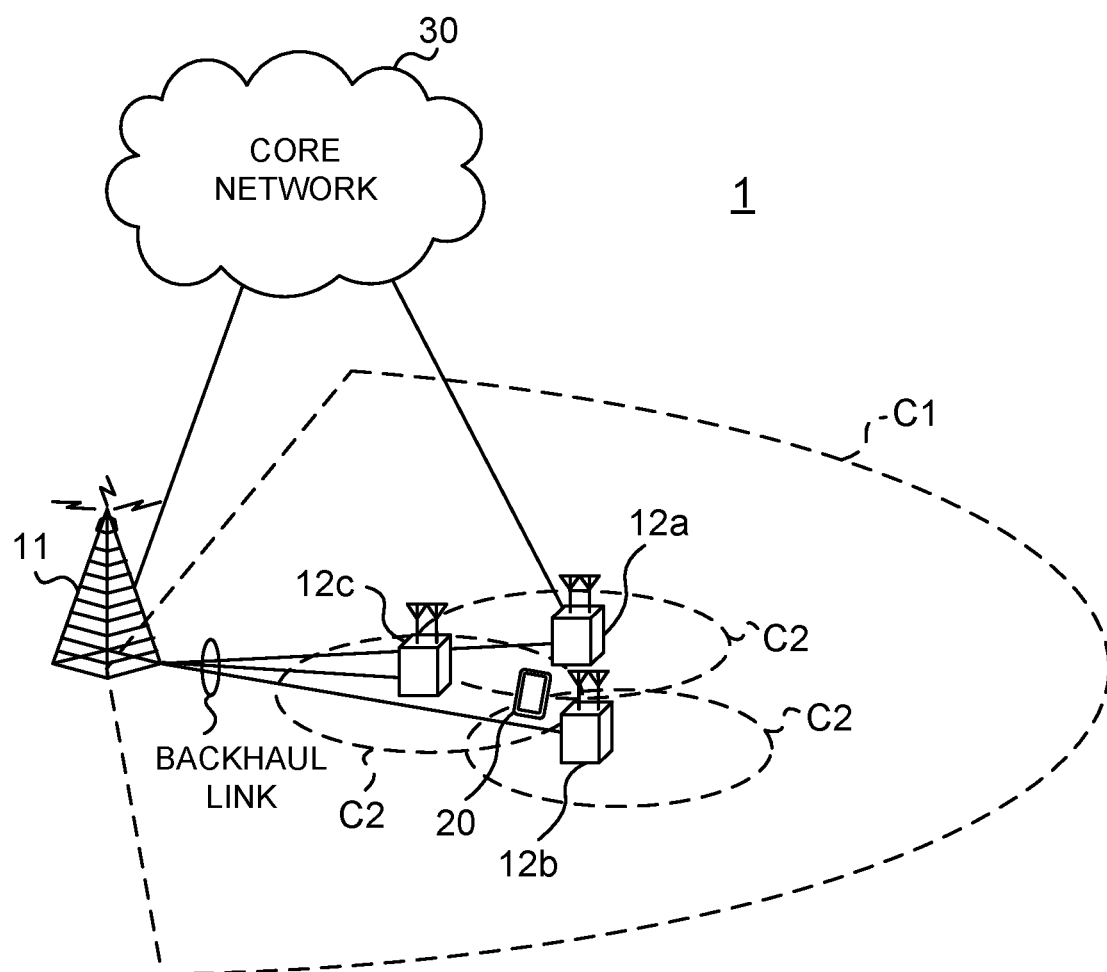
FIG. 6 is a diagram illustrating one example of a schematic configuration of a radio communication system according to one embodiment.

FIG. 6 is a diagram illustrating one example of a schematic configuration of the radio communication system according to the one embodiment. A radio communication system 1 may be a system that realizes communication by using Long Term Evolution (LTE) or the 5th generation mobile communication system New Radio (5G NR) specified by the Third Generation Partnership Project (3GPP).

Furthermore, the radio communication system 1 may support dual connectivity between a plurality of Radio Access Technologies (RATs) (Multi-RAT Dual Connectivity (MR-DC)). MR-DC may include dual connectivity (E-UTRA-NR Dual Connectivity (EN-DC)) of LTE (Evolved Universal Terrestrial Radio Access (E-UTRA)) and NR, and dual connectivity (NR-E-UTRA Dual Connectivity (NE-DC)) of NR and LTE.

According to EN-DC, a base station (eNB) of LTE (E-UTRA) is a Master Node (MN), and a base station (gNB) of NR is a Secondary Node (SN). According to NE-DC, a base station (gNB) of NR is an MN, and a base station (eNB) of LTE (E-UTRA) is an SN.

The radio communication system 1 may support dual connectivity between a plurality of base stations in an identical RAT (e.g., dual connectivity (NR-NR Dual Connectivity (NN-DC)) where both of the MN and the SN are base stations (gNBs) according to NR).

The radio communication system 1 may include a base station 11 that forms a macro cell C1 of a relatively wide coverage, and base stations 12 (12a to 12c) that are located in the macro cell C1 and form small cells C2 narrower than the macro cell C1. The user terminal 20 may be located in at least one cell. An arrangement and the numbers of respective cells and the user terminals 20 are not limited to the aspect illustrated in FIG. 6. The base stations 11 and 12 will be collectively referred to as a base station 10 below when not distinguished.

The user terminal 20 may connect with at least one of a plurality of base stations 10. The user terminal 20 may use at least one of Carrier Aggregation (CA) and Dual Connectivity (DC) that use a plurality of Component Carriers (CCs).

Each CC may be included in at least one of a first frequency range (Frequency Range 1 (FR 1)) and a second frequency range (Frequency Range 2 (FR 2)). The macro cell C1 may be included in the FR 1, and the small cell C2 may be included in the FR 2. For example, the FR 1 may be a frequency range equal to or less than 6 GHz (sub-6 GHz), and the FR 2 may be a frequency range higher than 24 GHz (above-24 GHz). In addition, the frequency ranges and definitions of the FR 1 and the FR 2 are not limited to these, and, for example, the FR 1 may correspond to a frequency range higher than the FR 2.

Furthermore, the user terminal 20 may perform communication by using at least one of Time Division Duplex (TDD) and Frequency Division Duplex (FDD) in each CC.

A plurality of base stations 10 may be connected by way of wired connection (e.g., optical fibers compliant with a Common Public Radio Interface (CPRI) or an X2 interface) or radio connection (e.g., NR communication). When, for example, NR communication is used as a backhaul between the base stations 11 and 12, the base station 11 corresponding to a higher station may be referred to as an Integrated Access Backhaul (IAB) donor, and the base station 12 corresponding to a relay station (relay) may be referred to as an IAB node.

The base station 10 may be connected with a core network 30 via the another base station 10 or directly. The core network 30 may include at least one of, for example, an Evolved Packet Core (EPC), a 5G Core Network (5GCN) and a Next Generation Core (NGC).

The user terminal 20 is a terminal that supports at least one of communication schemes such as LTE, LTE-A and 5G.

The radio communication system 1 may use an Orthogonal Frequency Division Multiplexing (OFDM)-based radio access scheme. For example, on at least one of Downlink (DL) and Uplink (UL), Cyclic Prefix OFDM (CP-OFDM), Discrete Fourier Transform Spread OFDM (DFT-s-OFDM), Orthogonal Frequency Division Multiple Access (OFDMA) and Single Carrier Frequency Division Multiple Access (SC-FDMA) may be used.

The radio access scheme may be referred to as a waveform. In addition, the radio communication system 1 may use another radio access scheme (e.g., another single carrier transmission scheme or another multicarrier transmission scheme) as the radio access scheme on UL and DL.

The radio communication system 1 may use a downlink shared channel (Physical Downlink Shared Channel (PDSCH)) shared by each user terminal 20, a broadcast channel (Physical Broadcast Channel (PBCH)) and a downlink control channel (Physical Downlink Control Channel (PDCCH)) as downlink channels.

Furthermore, the radio communication system 1 may use an uplink shared channel (Physical Uplink Shared Channel (PUSCH)) shared by each user terminal 20, an uplink control channel (Physical Uplink Control Channel (PUCCH)) and a random access channel (Physical Random Access Channel (PRACH)) as uplink channels.

User data, higher layer control information and a System Information Block (SIB) are conveyed on the PDSCH. The user data and the higher layer control information may be conveyed on the PUSCH. Furthermore, a Master Information Block (MIB) may be conveyed on the PBCH.

Lower layer control information may be conveyed on the PDCCH. The lower layer control information may include, for example, Downlink Control Information (DCI) including scheduling information of at least one of the PDSCH and the PUSCH.

In addition, DCI for scheduling the PDSCH may be referred to as, for example, a DL assignment or DL DCI, and DCI for scheduling the PUSCH may be referred to as, for example, a UL grant or UL DCI. In this regard, the PDSCH may be read as DL data, and the PUSCH may be read as UL data.

A COntrol REsource SET (CORESET) and a search space may be used to detect the PDCCH. The CORESET corresponds to a resource for searching DCI. The search space corresponds to a search domain and a search method of PDCCH candidates. One CORESET may be associated with one or a plurality of search spaces. The UE may monitor a CORESET associated with a certain search space based on a search space configuration.

One search space may be associated with a PDCCH candidate corresponding to one or a plurality of aggregation levels. One or a plurality of search spaces may be referred to as a search space set. In addition, a "search space", a "search space set", a "search space configuration", a "search space set configuration", a "CORESET" and a "CORESET configuration" in the present disclosure may be interchangeably read.

Uplink Control Information (UCI) including at least one of Channel State Information (CSI), transmission acknowledgement information (that may be referred to as, for example, Hybrid Automatic Repeat reQuest ACKnowledgement (HARQ-ACK) or ACK/NACK) and a Scheduling Request (SR) may be conveyed on the PUCCH. A random access preamble for establishing connection with a cell may be conveyed on the PRACH.

In addition, downlink and uplink in the present disclosure may be expressed without adding "link" thereto. Furthermore, various channels may be expressed without adding "physical" to heads of the various channels.

The radio communication system 1 may convey a Synchronization Signal (SS) and a Downlink Reference Signal (DL-RS). The radio communication system 1 may convey a Cell-specific Reference Signal (CRS), a Channel State Information Reference Signal (CSI-RS), a DeModulation Reference Signal (DMRS), a Positioning Reference Signal (PRS) and a Phase Tracking Reference Signal (PTRS) as DL-RSs.

The synchronization signal may be at least one of, for example, a Primary Synchronization Signal (PSS) and a Secondary Synchronization Signal (SSS). A signal block including the SS (the PSS or the SSS) and the PBCH (and the DMRS for the PBCH) may be referred to as, for example, an SS/PBCH block or an SS Block (SSB). In addition, the SS and the SSB may be also referred to as reference signals.

Furthermore, the radio communication system 1 may convey a Sounding Reference Signal (SRS) and a DeModulation Reference Signal (DMRS) as UpLink Reference Signals (UL-RSs). In this regard, the DMRS may be referred to as a user terminal-specific reference signal (UE-specific reference signal).

Base Station

Figure 7:
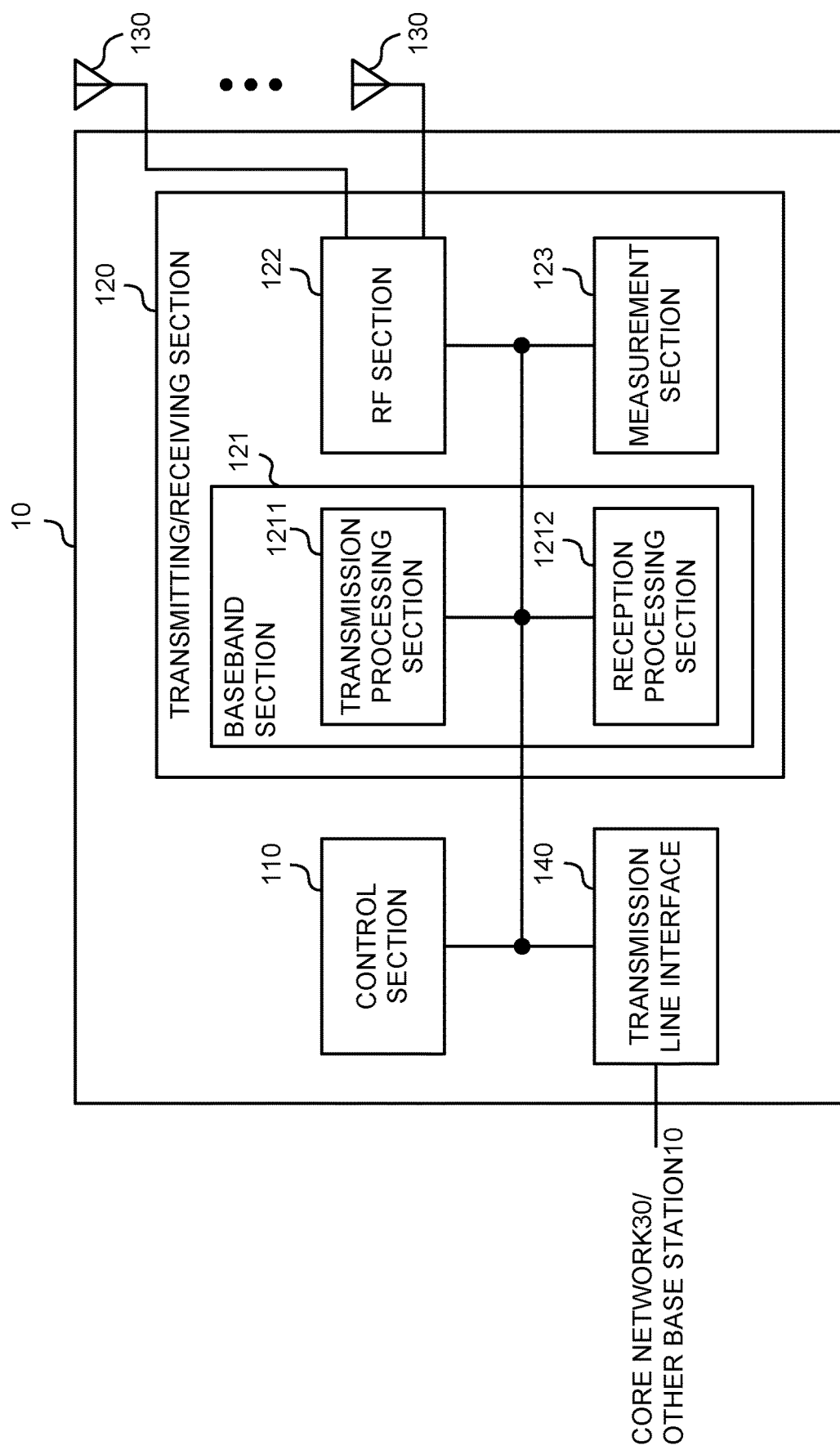
FIG. 7 is a diagram illustrating one example of a configuration of a base station according to the one embodiment.

FIG. 7 is a diagram illustrating one example of a configuration of the base station according to the one embodiment. The base station 10 includes a control section 110, a transmitting/receiving section 120, transmission/reception antennas 130 and a transmission line interface 140. In addition, the base station 10 may include one or more of each of the control sections 110, the transmitting/receiving sections 120, the transmission/reception antennas 130 and the transmission line interfaces 140.

In addition, this example mainly illustrates function blocks of characteristic portions according to the present embodiment, and may assume that the base station 10 includes other function blocks, too, that are necessary for radio communication. Part of processing of each section described below may be omitted.

The control section 110 controls the entire base station 10. The control section 110 can be composed of a controller or a control circuit described based on the common knowledge in the technical field according to the present disclosure.

The control section 110 may control signal generation and scheduling (e.g., resource allocation or mapping). The control section 110 may control transmission/reception and measurement that use the transmitting/receiving section 120, the transmission/reception antennas 130 and the transmission line interface 140. The control section 110 may generate data, control information or a sequence to be transmitted as a signal, and forward the signal to the transmitting/receiving section 120. The control section 110 may perform call processing (such as configuration and release) of a communication channel, state management of the base station 10 and radio resource management.

The transmitting/receiving section 120 may include a baseband section 121, a Radio Frequency (RF) section 122 and a measurement section 123. The baseband section 121 may include a transmission processing section 1211 and a reception processing section 1212. The transmitting/receiving section 120 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 120 may be composed as an integrated transmitting/receiving section, or may be composed of a transmitting section and a reception section. The transmitting section may be composed of the transmission processing section 1211 and the RF section 122. The receiving section may be composed of the reception processing section 1212, the RF section 122 and the measurement section 123.

The transmission/reception antenna 130 can be composed of an antenna such as an array antenna described based on the common knowledge in the technical field according to the present disclosure.

The transmitting/receiving section 120 may transmit the above-described downlink channel, synchronization signal and downlink reference signal. The transmitting/receiving section 120 may receive the above-described uplink channel and uplink reference signal.

The transmitting/receiving section 120 may form at least one of a transmission beam and a reception beam by using digital beam forming (e.g., precoding) or analog beam forming (e.g., phase rotation).

The transmitting/receiving section 120 (transmission processing section 1211) may perform Packet Data Convergence Protocol (PDCP) layer processing, Radio Link Control (RLC) layer processing (e.g., RLC retransmission control), and Medium Access Control (MAC) layer processing (e.g., HARQ retransmission control) on, for example, the data and the control information obtained from the control section 110, and generate a bit sequence to transmit.

The transmitting/receiving section 120 (transmission processing section 1211) may perform transmission processing such as channel coding (that may include error correction coding), modulation, mapping, filter processing, Discrete Fourier Transform (DFT) processing (when needed), Inverse Fast Fourier Transform (IFFT) processing, precoding and digital-analog conversion on the bit sequence to transmit, and output a baseband signal.

The transmitting/receiving section 120 (RF section 122) may modulate the baseband signal into a radio frequency range, perform filter processing and amplification on the signal, and transmit the signal of the radio frequency range via the transmission/reception antennas 130.

On the other hand, the transmitting/receiving section 120 (RF section 122) may perform amplification and filter processing on the signal of the radio frequency range received by the transmission/reception antennas 130, and demodulate the signal into a baseband signal.

The transmitting/receiving section 120 (reception processing section 1212) may apply reception processing such as analog-digital conversion, Fast Fourier Transform (FFT) processing, Inverse Discrete Fourier Transform (IDFT) processing (when needed), filter processing, demapping, demodulation, decoding (that may include error correction decoding), MAC layer processing, RLC layer processing and PDCP layer processing to the obtained baseband signal, and obtain user data.

The transmitting/receiving section 120 (measurement section 123) may perform measurement related to the received signal. For example, the measurement section 123 may perform Radio Resource Management (RRM) measurement or Channel State Information (CSI) measurement based on the received signal. The measurement section 123 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 123 may output a measurement result to the control section 110.

The transmission line interface 140 may transmit and receive (backhaul signaling) signals to and from apparatuses and the other base stations 10 included in the core network 30, and obtain and convey user data (user plane data) and control plane data for the user terminal 20.

In addition, the transmitting section and the receiving section of the base station 10 according to the present disclosure may be composed of at least one of the transmitting/receiving section 120, the transmission/reception antenna 130 and the transmission line interface 140.

In addition, the transmitting/receiving section 120 may transmit a PDSCH to the user terminal 20. The control section 110 may control the PDSCH such that a PDSCH transmitted from the another base station 10 and at least one of time and frequency resources overlap.

User Terminal

Figure 8:
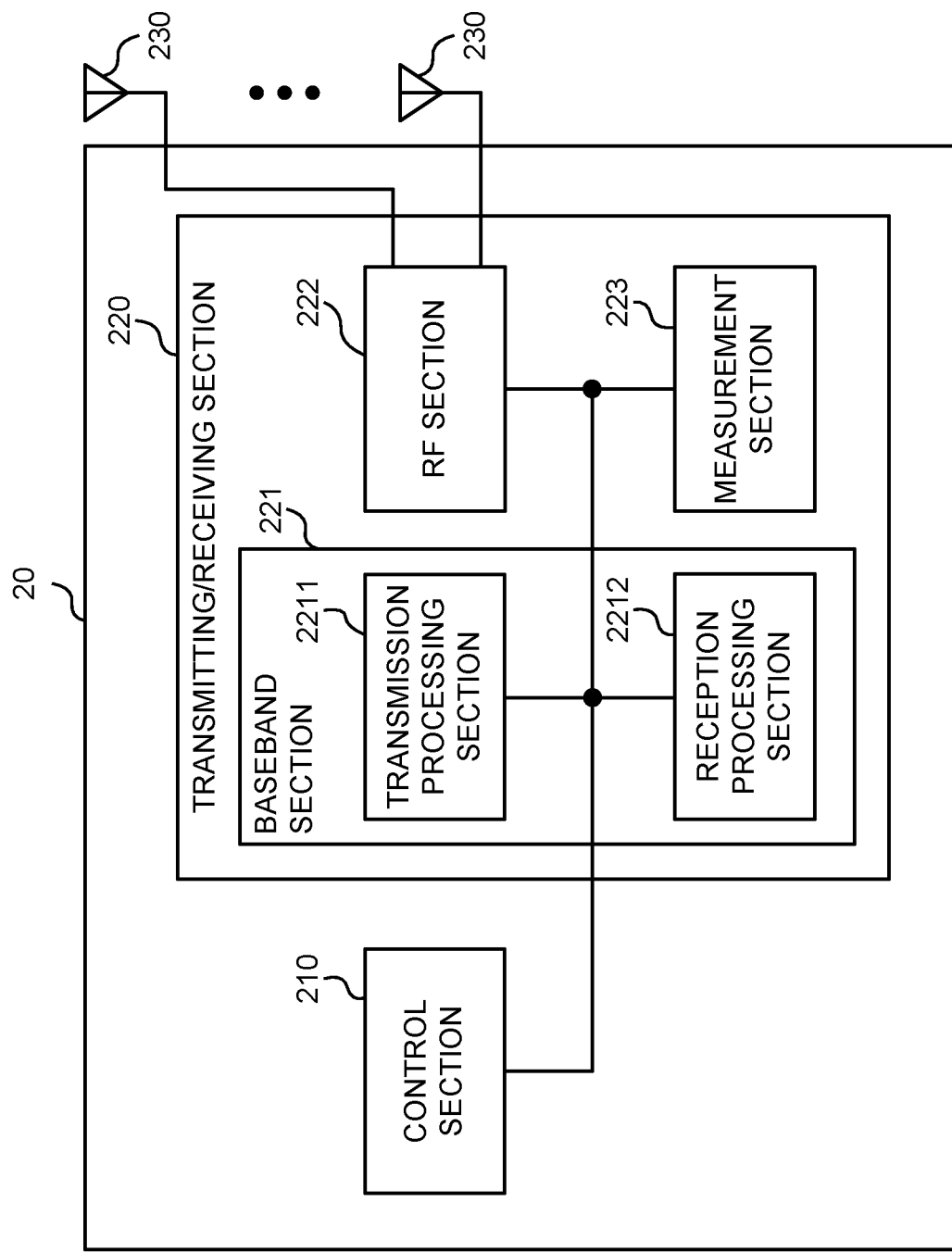
FIG. 8 is a diagram illustrating one example of a configuration of a user terminal according to the one embodiment.

FIG. 8 is a diagram illustrating one example of a configuration of the user terminal according to the one embodiment. The user terminal 20 includes a control section 210, a transmitting/receiving section 220 and transmission/reception antennas 230. In this regard, the user terminal 20 may include one or more of each of the control sections 210, the transmitting/receiving sections 220 and the transmission/reception antennas 230.

In addition, this example mainly illustrates function blocks of characteristic portions according to the present embodiment, and may assume that the user terminal 20 includes other function blocks, too, that are necessary for radio communication. Part of processing of each section described below may be omitted.

The control section 210 controls the entire user terminal 20. The control section 210 can be composed of a controller or a control circuit described based on the common knowledge in the technical field according to the present disclosure.

The control section 210 may control signal generation and mapping. The control section 210 may control transmission/reception and measurement that use the transmitting/receiving section 220 and the transmission/reception antennas 230. The control section 210 may generate data, control information or a sequence to be transmitted as a signal, and forward the signal to the transmitting/receiving section 220.

The transmitting/receiving section 220 may include a baseband section 221, an RF section 222 and a measurement section 223. The baseband section 221 may include a transmission processing section 2211 and a reception processing section 2212. The transmitting/receiving section 220 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 220 may be composed as an integrated transmitting/receiving section, or may be composed of a transmitting section and a reception section. The transmitting section may be composed of the transmission processing section 2211 and the RF section 222. The receiving section may be composed of the reception processing section 2212, the RF section 222 and the measurement section 223.

The transmission/reception antenna 230 can be composed of an antenna such as an array antenna described based on the common knowledge in the technical field according to the present disclosure.

The transmitting/receiving section 220 may receive the above-described downlink channel, synchronization signal and downlink reference signal. The transmitting/receiving section 220 may transmit the above-described uplink channel and uplink reference signal.

The transmitting/receiving section 220 may form at least one of a transmission beam and a reception beam by using digital beam forming (e.g., precoding) or analog beam forming (e.g., phase rotation).

The transmitting/receiving section 220 (transmission processing section 2211) may perform PDCP layer processing, RLC layer processing (e.g., RLC retransmission control) and MAC layer processing (e.g., HARQ retransmission control) on, for example, the data and the control information obtained from the control section 210, and generate a bit sequence to transmit.

The transmitting/receiving section 220 (transmission processing section 2211) may perform transmission processing such as channel coding (that may include error correction coding), modulation, mapping, filter processing, DFT processing (when needed), IFFT processing, precoding and digital-analog conversion on the bit sequence to transmit, and output a baseb and signal.

In this regard, whether or not to apply the DFT processing may be based on a configuration of transform precoding. When transform precoding is enabled for a certain channel (e.g., PUSCH), the transmitting/receiving section 220 (transmission processing section 2211) may perform the DFT processing as the above transmission processing to transmit the certain channel by using a DFT-s-OFDM waveform. When precoding is not enabled, the transmitting/receiving section 220 (transmission processing section 2211) may not perform the DFT processing as the above transmission processing.

The transmitting/receiving section 220 (RF section 222) may modulate the baseband signal into a radio frequency range, perform filter processing and amplification on the signal, and transmit the signal of the radio frequency range via the transmission/reception antennas 230.

On the other hand, the transmitting/receiving section 220 (RF section 222) may perform amplification and filter processing on the signal of the radio frequency range received by the transmission/reception antennas 230, and demodulate the signal into a baseband signal.

The transmitting/receiving section 220 (reception processing section 2212) may apply reception processing such as analog-digital conversion, FFT processing, IDFT processing (when needed), filter processing, demapping, demodulation, decoding (that may include error correction decoding), MAC layer processing, RLC layer processing and PDCP layer processing to the obtained baseband signal, and obtain user data.

The transmitting/receiving section 220 (measurement section 223) may perform measurement related to the received signal. For example, the measurement section 223 may perform, for example, RRM measurement or CSI measurement based on the received signal. The measurement section 223 may measure, for example, received power (e.g., RSRP), received quality (e.g., RSRQ, an SINR or an SNR), a signal strength (e.g., RSSI) or channel information (e.g., CSI). The measurement section 223 may output a measurement result to the control section 210.

In addition, the transmitting section and the receiving section of the user terminal 20 according to the present disclosure may be composed of at least one of the transmitting/receiving section 220 and the transmission/reception antenna 230.

In addition, the transmitting/receiving section 220 may receive a first Physical Downlink Shared Channel (PDSCH) of a first Transmission/Reception Point (TRP), and a second PDSCH of a second TRP whose at least one of the time and frequency resources overlaps the first PDSCH. That is, the transmitting/receiving section 220 may receive multiple PDSCHs.

In a case where the multiple TRPs (that may be read as multiple PDSCHs) are configured, the control section 210 may determine transmit power of uplink transmission (e.g., a PUCCH or a PUSCH) based on a cumulative value of Transmit Power Control (TPC) commands calculated per TRP.

The transmitting/receiving section 220 may perform the uplink transmission by using the transmit power.

In a case where a plurality of these TRPs are configured, the control section 210 may accumulate TPC commands per TRP at all times.

Even in the case where a plurality of these TRPs are configured, the control section 210 may accumulate TPC commands in a case where transmission and reception to and from one TRP are instantaneously performed, as a cumulative value of TPC commands that is common between the TRPs.

Even in the case where a plurality of these TRPs are configured, the control section 210 may accumulate TPC commands in a case where transmission and reception to and from one TRP are instantaneously performed, as a cumulative value of TPC commands for a single TRP.

Even in the case where a plurality of these TRPs are configured, the control section 210 may accumulate TPC commands in a case where transmission and reception to and from one TRP are instantaneously performed, as a cumulative value of TPC commands for each TRP.

Hardware Configuration

In addition, the block diagrams used to describe the above embodiments illustrate blocks in function units. These function blocks (components) are realized by an arbitrary combination of at least ones of hardware components and software components. Furthermore, a method for realizing each function block is not limited in particular. That is, each function block may be realized by using one physically or logically coupled apparatus or may be realized by connecting two or more physically or logically separate apparatuses directly or indirectly (by using, for example, wired connection or radio connection) and using a plurality of these apparatuses. Each function block may be realized by combining software with the above one apparatus or a plurality of above apparatuses.

In this regard, the functions include deciding, determining, judging, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as, for example, a transmitting unit or a transmitter. As described above, the method for realizing each function block is not limited in particular.

Figure 9:
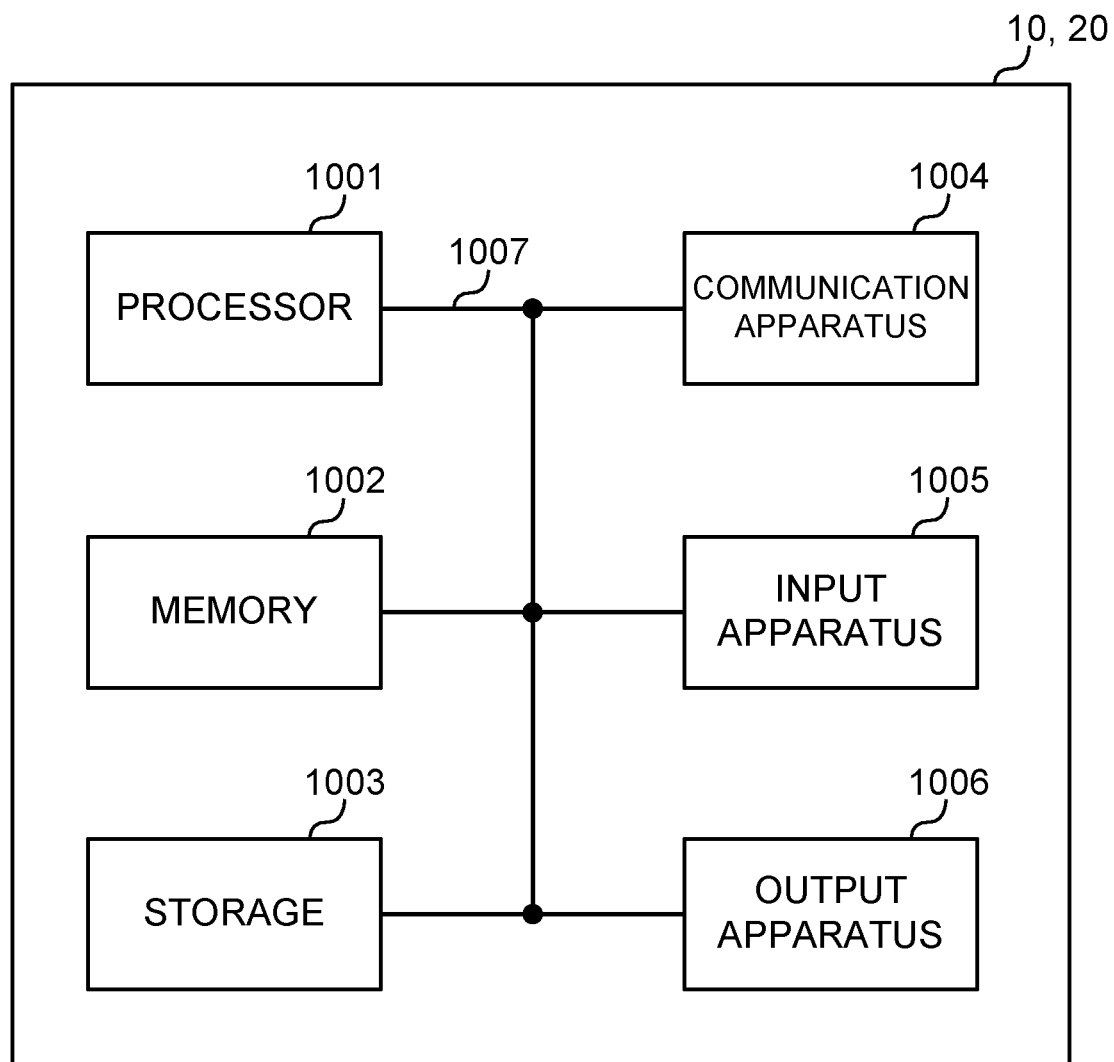
FIG. 9 is a diagram illustrating one example of hardware configurations of the base station and the user terminal according to the one embodiment.

For example, the base station and the user terminal according to the one embodiment of the present disclosure may function as computers that perform processing of the radio communication method according to the present disclosure. FIG. 9 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, words such as an apparatus, a circuit, a device, a section and a unit in the present disclosure can be interchangeably read. The hardware configurations of the base station 10 and the user terminal 20 may be configured to include one or a plurality of apparatuses illustrated in FIG. 9 or may be configured without including part of the apparatuses.

For example, FIG. 9 illustrates the only one processor 1001. However, there may be a plurality of processors. Furthermore, processing may be executed by 1 processor or processing may be executed by 2 or more processors simultaneously or successively or by using another method. In addition, the processor 1001 may be implemented by 1 or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, at least part of the above-described control section 110 (210) and transmitting/receiving section 120 (220) may be realized by the processor 1001.

Furthermore, the processor 1001 reads programs (program codes), software modules or data from at least one of the storage 1003 and the communication apparatus 1004 out to the memory 1002, and executes various types of processing according to these programs, software modules or data. As the programs, programs that cause the computer to execute at least part of the operations described in the above-described embodiments are used. For example, the control section 110 (210) may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as, for example, a register, a cache or a main memory (main storage apparatus). The memory 1002 can store programs (program codes) and software modules that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmitting/receiving section 120 (220) and transmission/reception antennas 130 (230) may be realized by the communication apparatus 1004. The transmitting/receiving section 120 (220) may be physically or logically separately implemented as a transmitting section 120a (220a) and a receiving section 120b (220b).

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these hardware components.

MODIFIED EXAMPLE

In addition, each term that has been described in the present disclosure and each term that is necessary to understand the present disclosure may be replaced with terms having identical or similar meanings. For example, a channel, a symbol and a signal (a signal or a signaling) may be interchangeably read. Furthermore, a signal may be a message. A reference signal can be also abbreviated as an RS, or may be referred to as a pilot or a pilot signal depending on standards to be applied. Furthermore, a Component Carrier (CC) may be referred to as, for example, a cell, a frequency carrier and a carrier frequency.

A radio frame may include one or a plurality of durations (frames) in a time domain. Each of one or a plurality of durations (frames) that makes up a radio frame may be referred to as a subframe. Furthermore, the subframe may include one or a plurality of slots in the time domain. The subframe may be a fixed time duration (e.g., 1 ms) that does not depend on a numerology.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, and specific windowing processing performed by the transceiver in a time domain.

The slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology.

The slot may include a plurality of mini slots. Each mini slot may include one or a plurality of symbols in the time domain. Furthermore, the mini slot may be referred to as a subslot. The mini slot may include a smaller number of symbols than that of the slot. The PDSCH (or the PUSCH) to be transmitted in larger time units than that of the mini slot may be referred to as a PDSCH (PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol. In addition, time units such as a frame, a subframe, a slot, a mini slot and a symbol in the present disclosure may be interchangeably read.

For example, 1 subframe may be referred to as a TTI, a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as, for example, a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmit power that can be used in each user terminal) in TTI units to each user terminal. In this regard, a definition of the TTI is not limited to this.

The TTI may be a transmission time unit of a channel-coded data packet (transport block), code block or code word, or may be a processing unit of scheduling or link adaptation. In addition, when the TTI is given, a time period (e.g., the number of symbols) in which a transport block, a code block or a code word is actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that make up a minimum time unit of the scheduling may be controlled.

The TTI having the time duration of 1 ms may be referred to as, for example, a general TTI (TTIs according to 3GPP Rel. 8 to 12), a normal TTI, a long TTI, a general subframe, a normal subframe, a long subframe or a slot. A TTI shorter than the general TTI may be referred to as, for example, a reduced TTI, a short TTI, a partial or fractional TTI, a reduced subframe, a short subframe, a mini slot, a subslot or a slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. The numbers of subcarriers included in RBs may be the same irrespectively of a numerology, and may be, for example, 12. The numbers of subcarriers included in the RBs may be determined based on the numerology.

Furthermore, the RB may include one or a plurality of symbols in the time domain or may have the length of 1 slot, 1 mini slot, 1 subframe or 1 TTI. 1 TTI or 1 subframe may each include one or a plurality of resource blocks.

In this regard, one or a plurality of RBs may be referred to as, for example, a Physical Resource Block (Physical RB (PRB)), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

A Bandwidth Part (BWP) (that may be referred to as, for example, a partial bandwidth) may mean a subset of contiguous common Resource Blocks (common RBs) for a certain numerology in a certain carrier. In this regard, the common RB may be specified by an RB index based on a common reference point of the certain carrier. A PRB may be defined based on a certain BWP, and may be numbered in the certain BWP.

The BWP may include a UL BWP (a BWP for UL) and a DL BWP (a BWP for DL). One or a plurality of BWPs in 1 carrier may be configured to the UE.

At least one of the configured BWPs may be active, and the UE may not assume to transmit and receive given signals/channels outside the active BWP. In addition, a "cell" and a "carrier" in the present disclosure may be read as a "BWP".

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (such as the PUCCH and the PDCCH) and information elements can be identified based on various suitable names. Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspect/embodiments described in the present disclosure and may be performed by using other methods. For example, the information may be notified in the present disclosure by a physical layer signaling (e.g., Downlink Control Information (DCI) and Uplink Control Information (UCI)), a higher layer signaling (e.g., a Radio Resource Control (RRC) signaling, broadcast information (such as a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Judgement may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used. The "network" may mean an apparatus (e.g., base station) included in the network.

In the present disclosure, terms such as "precoding", a "precoder", a "weight (precoding weight)", "Quasi-Co-Location (QCL)", a "Transmission Configuration Indication state (TCI state)", a "spatial relation", a "spatial domain filter", "transmit power", "phase rotation", an "antenna port", an "antenna port group", a "layer", "the number of layers", a "rank", a "resource", a "resource set", a "resource group", a "beam", a "beam width", a "beam angle", an "antenna", an "antenna element" and a "panel" can be interchangeably used.

In the present disclosure, terms such as a "Base Station (BS)", a "radio base station", a "fixed station", a "NodeB", an "eNodeB (eNB)", a "gNodeB (gNB)", an "access point", a "Transmission Point (TP)", a "Reception Point (RP)", a "Transmission/Reception Point (TRP)", a "panel", a "cell", a "sector", a "cell group", a "carrier" and a "component carrier" can be interchangeably used. The base station is also referred to as terms such as a macro cell, a small cell, a femtocell or a picocell.

The base station can accommodate one or a plurality of (e.g., three) cells. When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of at least one of the base station and the base station subsystem that provide a communication service in this coverage.

In the present disclosure, the terms such as "Mobile Station (MS)", "user terminal", "user apparatus (UE: User Equipment)" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as, for example, a transmission apparatus, a reception apparatus or a radio communication apparatus. In addition, at least one of the base station and the mobile station may be, for example, a device mounted on a movable body or the movable body itself. The movable body may be a vehicle (e.g., a car or an airplane), may be a movable body (e.g., a drone or a self-driving car) that moves unmanned or may be a robot (a manned type or an unmanned type). In addition, at least one of the base station and the mobile station includes an apparatus, too, that does not necessarily move during a communication operation. For example, at least one of the base station and the mobile station may be an Internet of Things (IoT) device such as a sensor.

Furthermore, the base station in the present disclosure may be read as the user terminal. For example, each aspect/embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Furthermore, words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are regarded as, for example, Mobility Management Entities (MMEs) or Serving-Gateways (S-GWs), yet are not limited to these) other than the base stations or a combination of these.

Each aspect/embodiment described in the present disclosure may be used alone, may be used in combination or may be switched and used when carried out. Furthermore, orders of the processing procedures, the sequences and the flowchart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New-Radio Access Technology (RAT), New Radio (NR), New radio access (NX), Future generation radio access (FX), the Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods, or next-generation systems that are enhanced based on these systems. Furthermore, a plurality of systems may be combined (for example, LTE or LTE-A and 5G may be combined) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be considered to "decide (determine)" judging, calculating, computing, processing, deriving, investigating, looking up, search and inquiry (e.g., looking up in a table, a database or another data structure), and ascertaining.

Furthermore, "deciding (determining)" may be considered to "decide (determine)" receiving (e.g., receiving information), transmitting (e.g., transmitting information), input, output and accessing (e.g., accessing data in a memory).

Furthermore, "deciding (determining)" may be considered to "decide (determine)" resolving, selecting, choosing, establishing and comparing. That is, "deciding (determining)" may be considered to "decide (determine)" some operation.

Furthermore, "deciding (determining)" may be read as "assuming", "expecting" and "considering".

The words "connected" and "coupled" used in the present disclosure or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in the present disclosure that, when connected, the two elements are "connected" or "coupled" with each other by using 1 or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". In this regard, the sentence may mean that "A and B are each different from C". Words such as "separate" and "coupled" may be also interpreted in a similar way to "different".

When the words "include" and "including" and modifications of these words are used in the present disclosure, these words intend to be comprehensive similar to the word "comprising". Furthermore, the word "or" used in the present disclosure intends to not be an exclusive OR.

When, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiments described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The invention claimed is:

1. A terminal comprising:
   a control section that determines, based on a cumulative value of transmit power control (TPC) commands calculated for a physical uplink control channel (PUCCH) resource group, transmit power of a PUCCH corresponding to the PUCCH resource group; and
   a transmitting section that transmits the PUCCH by using the transmit power.

2. The terminal according to claim 1, wherein the PUCCH resource group is a PUCCH resource group for updating a spatial relation.

3. The terminal according to claim 2, wherein, even when a plurality of transmission/reception points (TRPs) is configured, the control section accumulates a TPC command in a case where transmission and reception to and from one TRP are instantaneously performed, as a cumulative value of TPC commands that is common between the TRPs.

4. The terminal according to claim 2, wherein, even when a plurality of TRPs is configured, the control section accumulates a TPC command in a case where transmission and reception to and from one TRP are instantaneously performed, as a cumulative value of TPC commands for a single TRP.

5. The terminal according to claim 2, wherein, even when a plurality of TRPs is configured, the control section accumulates a TPC command in a case where transmission and reception to and from one TRP are instantaneously performed, as a cumulative value of TPC commands for each TRP.

6. The terminal according to claim 2, wherein the transmitting section transmits user equipment (UE) capability information indicating at least one of: whether or not the UE can simultaneously receive signals which have no quasi-co-location (QCL) relation of QCL type D; supported hybrid automatic repeat request (HARQ) feedback; and supported overlapping type of time/frequency resources of multiple physical downlink shared channels (PDSCHs).

7. The terminal according to claim 1, wherein, even when a plurality of transmission/reception points (TRPs) is configured, the control section accumulates a TPC command in a case where transmission and reception to and from one TRP are instantaneously performed, as a cumulative value of TPC commands that is common between the TRPs.

8. The terminal according to claim 7, wherein the transmitting section transmits user equipment (UE) capability information indicating at least one of: whether or not the UE can simultaneously receive signals which have no quasi-co-location (QCL) relation of QCL type D; supported hybrid automatic repeat request (HARQ) feedback; and supported overlapping type of time/frequency resources of multiple physical downlink shared channels (PDSCHs).

9. The terminal according to claim 1, wherein, even when a plurality of TRPs is configured, the control section accumulates a TPC command in a case where transmission and reception to and from one TRP are instantaneously performed, as a cumulative value of TPC commands for a single TRP.

10. The terminal according to claim 9, wherein the transmitting section transmits user equipment (UE) capability information indicating at least one of: whether or not the UE can simultaneously receive signals which have no quasi-co-location (QCL) relation of QCL type D; supported hybrid automatic repeat request (HARQ) feedback; and supported overlapping type of time/frequency resources of multiple physical downlink shared channels (PDSCHs).

11. The terminal according to claim 1, wherein, even when a plurality of TRPs is configured, the control section accumulates a TPC command in a case where transmission and reception to and from one TRP are instantaneously performed, as a cumulative value of TPC commands for each TRP.

12. The terminal according to claim 11, wherein the transmitting section transmits user equipment (UE) capability information indicating at least one of: whether or not the UE can simultaneously receive signals which have no quasi-co-location (QCL) relation of QCL type D; supported hybrid automatic repeat request (HARQ) feedback; and supported overlapping type of time/frequency resources of multiple physical downlink shared channels (PDSCHs).

13. The terminal according to claim 1, wherein the transmitting section transmits user equipment (UE) capability information indicating at least one of: whether or not the UE can simultaneously receive signals which have no quasi-co-location (QCL) relation of QCL type D; supported hybrid automatic repeat request (HARD) feedback; and supported overlapping type of time/frequency resources of multiple physical downlink shared channels (PDSCHs).

14. A radio communication method for a terminal, comprising:
   determining, based on a cumulative value of transmit power control (TPC) commands calculated for a physical uplink control channel (PUCCH) resource group, transmit power of a PUCCH corresponding to the PUCCH resource group; and
   transmitting the PUCCH by using the transmit power.

15. A system comprising a terminal and a base station, wherein the terminal comprises:
   a control section that determines, based on a cumulative value of transmit power control (TPC) commands calculated for a physical uplink control channel (PUCCH) resource group, transmit power of a PUCCH corresponding to the PUCCH resource group; and
   a transmitting section that transmits the PUCCH by using the transmit power, and the base station comprises:
   a receiving section that receives the PUCCH.

* * * * *